(12) United States Patent
Varga et al.

(10) Patent No.: US 6,980,887 B2
(45) Date of Patent: Dec. 27, 2005

(54) APPARATUS AND METHOD FOR IMPROVED VENDING MACHINE INVENTORY MAINTENANCE

(75) Inventors: Steve Varga, Memphis, TN (US); Bryan Eagle, III, Memphis, TN (US); Richard Desmarais, Brookline, NH (US); Robert Cowling, Memphis, TN (US); Michael D. Lemieux, Nashua, NH (US); John Hall, Bartlett, TN (US)

(73) Assignee: Vending Management Services Limited, Masterton (NZ)

( * ) Notice: Subject to any disclaimer, the term of this patent is extended or adjusted under 35 U.S.C. 154(b) by 836 days.

(21) Appl. No.: 10/001,696

(22) Filed: Oct. 31, 2001

(65) Prior Publication Data

US 2002/0161475 A1 Oct. 31, 2002

Related U.S. Application Data

(63) Continuation of application No. 09/427,954, filed on Oct. 27, 1999, which is a continuation of application No. 08/649,742, filed on May 15, 1996, now Pat. No. 6,181,981.

(51) Int. Cl.$^7$ .............................................. G06F 17/00
(52) U.S. Cl. ........................ 700/236; 700/244; 221/6; 221/9; 705/28
(58) Field of Search ............................... 700/231, 236, 700/241, 242, 244; 221/6, 9; 705/28

(56) References Cited

U.S. PATENT DOCUMENTS

| | | |
|---|---|---|
| 4,350,238 A | 9/1982 | Shah et al. |
| 4,369,442 A | 1/1983 | Werth et al. |
| 4,398,651 A | 8/1983 | Kumpfer |
| 4,412,292 A | 10/1983 | Sedam et al. |
| 4,419,734 A | 12/1983 | Wolfson et al. |
| 4,533,211 A | 8/1985 | Bjorklund et al. |
| 4,611,205 A | 9/1986 | Eglise |
| 4,766,548 A | 8/1988 | Cedrone et al. |
| 4,872,541 A | 10/1989 | Hayashi |
| 5,029,098 A | 7/1991 | Levasseur |
| 5,091,713 A | 2/1992 | Horne et al. |
| 5,159,560 A | 10/1992 | Newell et al. |
| 5,207,784 A | 5/1993 | Schwartzendruber |
| 5,238,382 A | 8/1993 | Weder et al. |
| 5,282,127 A | 1/1994 | Mii |
| 5,285,382 A | 2/1994 | Muehlberger et al. |
| 5,303,844 A | 4/1994 | Muehlberger |
| 5,608,643 A | 3/1997 | Wichter et al. |
| 5,706,976 A | 1/1998 | Purkey |
| 5,790,409 A | 8/1998 | Fedor et al. |
| 5,924,081 A | 7/1999 | Ostendorf et al. |
| 5,930,771 A | 7/1999 | Stapp |

(Continued)

OTHER PUBLICATIONS

Meet the Smart Coke Machine; The Sacramento Bee Business Technology; Wednesday, Aug. 30, 1995.
Skywire Provides Details of Wireless "VendView" System; Vending Times, Sep., 1994.
Skywire Allows Vendor Tracking of Pop Stock and Sales Details; RCR, vol. 14, No. 17, Sep. 4, 1995.
Left high and dry? Sold-out machine sends for Cokes; Nashville Banner, Wednesday, Aug. 15, 1995.
Coke machines signal when it's time for a refill; the Globe & Mail, Toronto, ON, Aug. 30, 1995.
Wireless Communications Forum; vol. III, No. 1, Apr. 1995.

*Primary Examiner*—Emanuel Todd Voeltz
(74) *Attorney, Agent, or Firm*—Withrow & Terranova, PLLC

(57) ABSTRACT

Inventory maintenance is improved for a system of one or more vending machines by providing one or more vending machines with unique identifiers, and means for collecting and transmitting information concerning goods dispensed and other status to a remote location where processing means provide an efficient service schedule.

130 Claims, 14 Drawing Sheets

U.S. PATENT DOCUMENTS

| | | |
|---|---|---|
| 5,941,363 A | 8/1999 | Partyka et al. |
| 5,963,452 A | 10/1999 | Etoh et al. |
| 5,997,928 A | 12/1999 | Kaish et al. |
| 6,056,194 A | 5/2000 | Kolls |
| 6,102,162 A | 8/2000 | Teicher |
| 6,115,649 A | 9/2000 | Sakata |
| 6,123,223 A | 9/2000 | Watkins |
| 6,154,648 A | 11/2000 | Comer |
| 6,181,981 B1 | 1/2001 | Varga et al. |
| 6,199,720 B1 | 3/2001 | Rudick et al. |

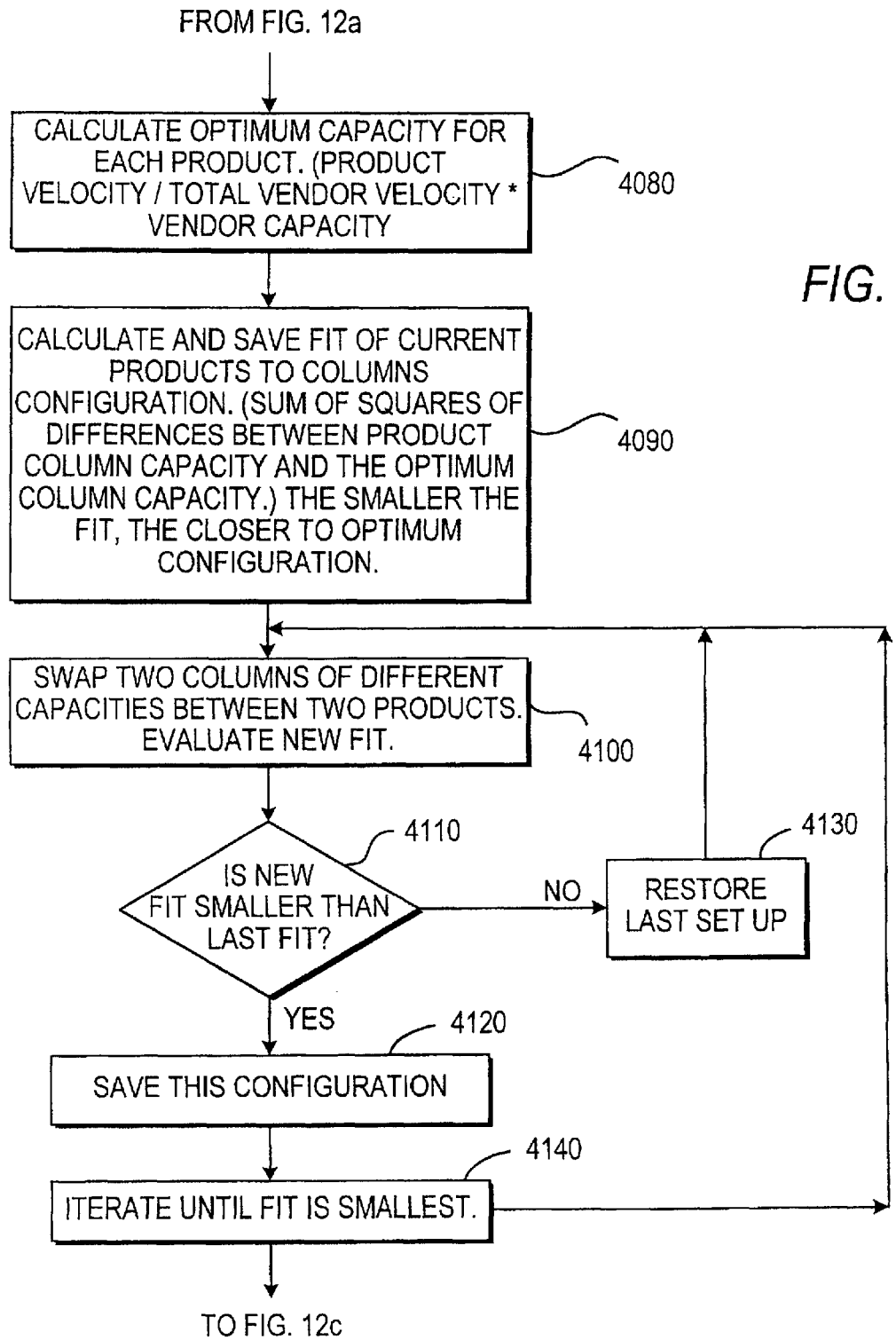

APPARATUS AND METHOD FOR IMPROVED VENDING MACHINE INVENTORY MAINTENANCE

This is a continuation of application Ser. No. 09/427,954 filed on Oct. 27, 1999, which is a continuation of Ser. No. 08/649,742 filed May 15, 1996, now U.S. Pat. No. 6,181, 981. This application claims the benefit of the filing date of U.S. Pat. No. 6,181,981.

BACKGROUND INFORMATION

Owners of vending machines face a dilemma: increasing the number of service calls increases the chances that a vending machine will function properly and have adequate inventory at any given time, but increases costs, while reducing the number of service calls reduces costs but increases the chances of lost revenues through malfunction or out-of-stock conditions.

A challenge to the industry has been to find the frequency of service calls which maximizes profits, i.e., to balance the increased cost of additional service calls with the increased revenue of additional sales.

Two approaches have been used: improving the quality of information with respect to the current status of inventory at a given vending machine (or a network of such machines), and improving the quality of analysis of such information in order to improve predictions of the need for future service calls.

An example of the first approach may be found in U.S. Pat. No. 5,207,784, issued on May 4, 1993 to Schwartzendruber for "Vending Machine with Monitoring System", and assigned to Skywire, LP (and therefore commonly owned with the instant application). As described therein, a vending machine is equipped with means for determining current inventory and other status and transmitting that information to a remote location to aid in scheduling service calls. The technique described in the '784 patent requires two-way communication between the vending machine and a remote monitoring center. Providing similar capabilities using one-way communications can reduce cost.

The instant invention provides advanced information gathering, transmitting and analysis capabilities.

In describing the state of the art and the invention, it will be helpful to begin with a generalized description of a typical vending machine and how it is typically stocked and serviced.

Vending machines typically comprise means for storing goods to be dispensed, cash receiving means for receiving cash deposits from a user, cash calculating means for determining the value of the cash deposited by the user, good pricing means for determining the price of a particular good selected by the user, comparator means for comparing the value of the cash deposited by the user with the price of the good selected by the user, and dispensing apparatus for dispensing the selected good if the user has deposited sufficient cash and for dispensing cash if change is required. Vending machines may also include means for detecting certain conditions, such as out-of-stock, jam or unauthorized entry. On modern machines, the above functions are controlled electronically, typically by 120 VAC controls.

A modern vending machine can have a variable number of product selection buttons, a variable number of supply columns, supply columns of different capacities, and the capability to assign columns to buttons. For example, multiple supply columns may be assigned to the same button. Typically, each selection button is associated with a single product, of which multiple items are available for sale. Thus, it is possible to provide various capacities for various products.

By way of example, a typical cold drink dispensing vending machine has from six to twelve selection buttons, but from six to twenty supply columns, with each supply column having a capacity of from 15 to 65 items of the product.

The rate of sale of any given product may vary from vending machine to vending machine, and may also vary at a particular machine over a period of time. The rate of sale for a particular product is referred to as its "velocity". Where a product is stored in multiple supply columns, the total velocity of the product is the sum of the velocity of each of such supply columns.

Vendors (the owners of vending machines) typically employ maintenance personnel who periodically make service calls to physically inspect the machine to determine inventory status, restock if necessary, correct any faults (such as a jam) and collect the cash deposited by users.

If the maintenance personnel arrive when there is sufficient inventory and no fault, the cost of the maintenance trip is wasted; if they arrive after inventory has been exhausted or a fault has gone unremedied, sales may have been lost.

Because of the inherent delay in scheduling restocking of inventory, typically, inventory would not be allowed to drop to zero before initiating the restocking process, but rather a "resupply trigger level", would be chosen at a level designed to permit time for restocking before the inventory is exhausted.

If a product's inventory level at a given time and velocity are known for a given vending machine, it is possible to project the inventory level at a future time. This projection allows determination of a restocking schedule and route, with the goal being to optimize the restocking interval. Ideally, the number and capacity of supply columns would be chosen such that each product inventory would approach the resupply trigger level at the same time.

Finally, it is common for vending machines to be managed as a group, it being more efficient and economical to stock and service a network of such machines than a single machine.

SUMMARY OF THE INVENTION

Accordingly, it is an object of the present invention to provide a solution to the dilemma of scheduling service calls.

This dilemma is solved, in accordance with the present invention, by providing a self-monitoring vending machine with remote network communication and a process for analyzing information so communicated in order to provide efficient scheduling of service calls.

Among the principal features of the invention are electronic monitoring means coupled to monitoring points within a vending machine, capable of identifying critical characteristics of said machine's operations, including cash received and numbers of various goods dispensed and fault conditions; means for assembling such data and translating it into a standard format for transmission to a remote location; means for transmitting such formatted data to a remote location, (in one embodiment, using one-way communications); and a method for processing the data to enable efficient restocking.

A principal advantage of such an approach is the reduction in non-productive maintenance visits and the reduction in lost revenue due to out-of-stock or fault conditions.

Another object of the invention is to provide advance information as to the status of a vending machine so that the delivery of replacement inventory to a system of vending machines can be scheduled efficiently. The advantage of such advance information is that it allows inventory to be loaded into a delivery vehicle in a manner which permits efficient off-loading to vending machine sites.

The various features of novelty which characterize the invention are pointed out with particularity in the claims annexed to and forming a part of this disclosure. For a better understanding of the invention, its advantages and objects, reference is made to the accompanying drawings and descriptive matter in which a preferred embodiment of the invention is illustrated.

BRIEF DESCRIPTION OF THE DRAWINGS

The foregoing and still other objects of this invention will become apparent, along with various advantages and features of novelty residing in the present embodiments, from study of the following drawings, in which:

FIG. 3 is a schematic diagram of a preferred CPU in a vending machine monitoring and reporting system according to the present invention;

FIG. 4 is a schematic diagram of a preferred CPU expansion connector in a vending machine monitoring and reporting system according to the present invention;

FIG. 5 is a schematic diagram of a preferred CPU input capability in a vending machine monitoring and reporting system according to the present invention;

FIG. 6 is a schematic diagram of preferred communications ports in a vending machine monitoring and reporting system according to the present invention;

FIG. 7 is a schematic diagram of a preferred modem port in a vending machine monitoring and reporting system according to the present invention;

FIG. 8 is a schematic of a preferred power supply in a vending machine monitoring and reporting system according to the present invention;

FIG. 9 is a schematic of a preferred connector between CPU and input board in a vending machine monitoring and reporting system according to the present invention;

FIGS. 10 and 11 are schematics of a preferred input board in a vending machine monitoring and reporting system according to the present invention.

DESCRIPTION OF THE PREFERRED EMBODIMENT

The invention will first be described with reference to a vending machine incorporating the apparatus of the present invention. It will be appreciated by those skilled in the art that the invention could likewise be practiced by retrofitting an existing vending machine so as to function as described. Apparatus and a method for such a retrofit will be presented as well. Finally, a process for using the information generated so as to provide an efficient schedule for service calls, equally applicable to either type of vending machine, will be described.

Figure 1:
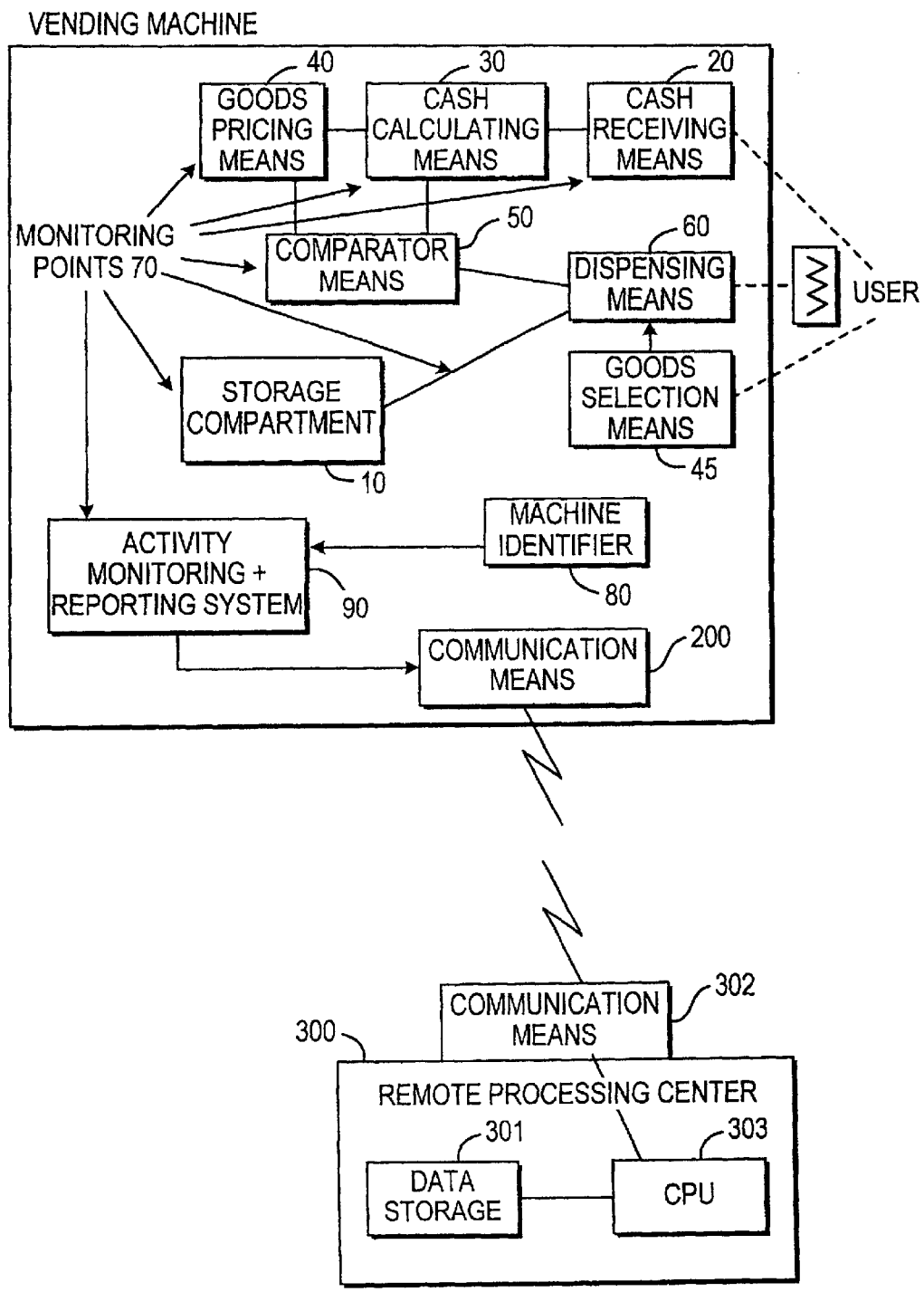
FIG. 1 is a block diagram of a vending machine monitoring and reporting system according to a preferred embodiment of the invention.

Shown in FIG. 1 a vending machine (1) comprises one or more storage compartments (10) for storing one or more categories of goods to be dispensed; cash receiving means (20) for receiving cash deposits from a user, cash calculating means (30) for determining the value of the cash deposited by the user, goods pricing means (40) for determining the price of particular goods selected by the user, good selection means (45) for allowing a user to select goods to be dispensed, comparator means (50) for comparing the value of the cash deposited by the user with the price of the goods selected by the user, and dispensing apparatus (60) responsive to user selection for dispensing the selected goods if the user has deposited sufficient cash and for dispensing cash if change is required. Vending machine (1) may also include means for detecting certain conditions, such as out-of-stock, jam or unauthorized entry. There is further provided within said vending machine a plurality of monitoring points (70) (typically 120 VAC monitoring points) for monitoring the operation of the vending machine, i.e., the receipt of cash and dispensing of change, the selection of goods by a user, the actual dispensing of the goods so selected and fault conditions. Finally, the vending machine is provided with a unique machine identifier (80), such as a serial number, electronically encoded. Vending machine (1) further comprises activity monitoring and reporting system (90) according to a preferred embodiment of the present invention, and communication means (200) for communicating data with respect to sales and other machine conditions to a remote processing center (300).

Figure 2:
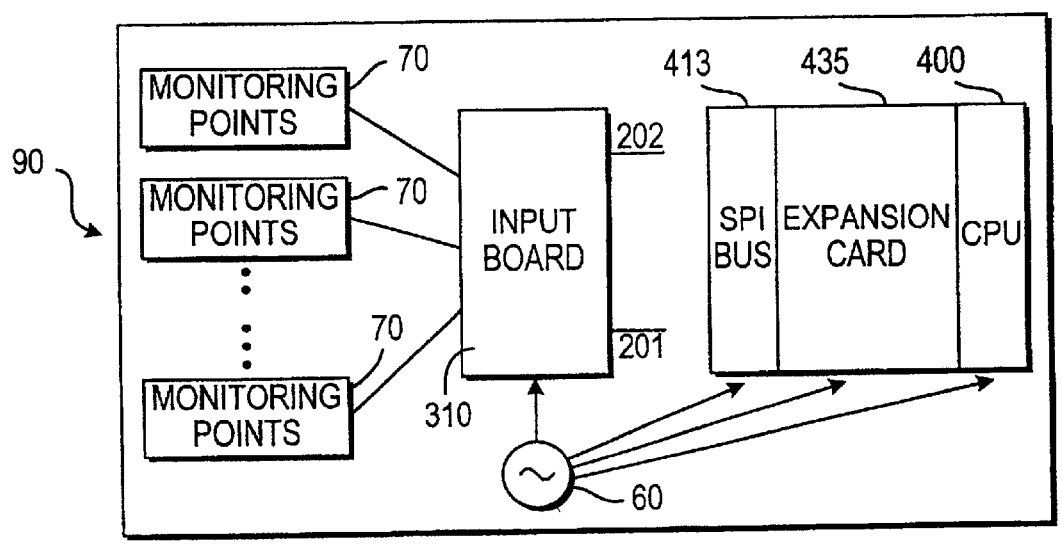
FIG. 2 is a block diagram of a preferred CPU in a vending machine monitoring and reporting system according to the invention.

Referring to FIG. 2 for additional details of the activity monitoring and reporting system, the system (100) includes 120 VAC monitoring points (70) operatively coupled to an input board (310). Input board (310) connects to expansion connector (435) on a CPU (400), preferably using optocouplers (202) to provides an optoisolated interface to various monitoring points (70) within the vending machine. In addition, another "always on" AC input 201 provides a signal that is synchronous with AC zero volt crossings. This synchronous signal is divided, delayed and supplied to CPU (400) as a processor interrupt which is used to cause the processor to read the input point status. This design requires that all the AC in the machine be referenced back to a single neutral return line.

Monitoring points (70) within vending machine (1) may include switches and motors indicating product status.

CPU (400) is cooperatively coupled for communication, for example through communications means (200) (for example a network modem, such as a network radio modem or a public service telephone modem). The input board (310), CPU (400), and communications means (200) are each powered by a low voltage AC power supply (600). Thus configured, system (100) can monitor and report activity within a vending machine.

It is desirable to filter the supplied electric power using a low-pass filter in order to improve reliability and to remain within FCC-mandated limits on electromagnetic emissions. The capacitor selected as filter must also be designed to withstand the heating effects of current surging through it and still operate to the product's designed lifetime. The amount of heat generated is determined by the capacitor's equivalent series resistance. A related parameter is the capacitor manufacturer's specified ripple current rating at a particular temperature. A capacitor with a ripple rating of greater than 2.5 A at 85 degrees C. is preferred in this design.

A suitable microprocessor would be a MOTOROLA (™) MC68HC11F1FN, which is based on Motorola's standard 68HC11 core and packaged in a 68-pin PLCC. The MOTOROLA (™) microprocessor comprises a clock driven by an external, parallel resonant 9.8304 MHz crystal 412 in a standard HC-49 welded metal package. The oscillator built into the microprocessor causes the crystal 412 to oscillate at its fundamental frequency and then divides it by four to arrive at a microprocessor logic clock (or system clock, also known as the E clock) of 2.4576 MHz.

The CPU (400) further comprises a Serial Peripheral Interface (SPI) synchronous bus subsystem (413), driven by microprocessor through expansion connector (435), and comprising a clocked serial data port with a send data line, receive data line and processor-driven clock line all supported on the processor at +5 VDC CMOS levels. The SPI bus (413) provides an interface to input board (310). It can also be interfaced to multiple SPI bus peripherals on the expansion card (435) if a separate output line is used as a select line for each SPI device. Typical peripheral devices that support a SPI bus interface include EEPROMS, A/D converters, D/A converters, real time clocks and general purpose I/O devices.

The SPI subsystem (413) operates as a shift register, with data shifted out of the processor's send data pin and into the processor's receive data pin synchronous with the transitions on the clock line. Additional devices can be hung on the bus, each with its own chip select line, allowing devices to be either selected or not as desired. When a device is not selected, it ignores incoming data and allows its send data line to float. When a device is selected, it receives incoming serial data and clock signals and asserts its output line thereby sending data back to the processor.

Preferably, microprocessor (410) also has an internal watchdog timer which can be used to monitor the operation of the microprocessor and prevent it from operating improperly, for example due to a static discharge. The internal watchdog can be enabled or disabled by writing a processor register, and its timeout period, based on the system clock frequency, can be changed based on the values in another internal processor register. When the internal watchdog times out, it does not automatically generate a reset pulse. Instead, it generates an interrupt and starts executing at the location set by the internal watchdog vector. This service routine can, if desired, contain code to initiate a bidirectional hardware reset (executing a STOP instruction with the Clock Monitor Enable bit set).

CPU (400) expansion connector (435) is designed to accommodate I/O devices such as discrete inputs and outputs, a real time clock, as well as A/D converters, D/A converters and their necessary conditioning circuitry. In particular, the expansion connector is an interface between the SPI bus (413) of the microprocessor (410) and the input board (310).

With the physical structure described, the operation of the system will now be described.

At each of the monitoring points (70), data is collected and translated into a standard data reporting format. For example, if a user deposits $1.00, selects item A (priced at $0.60), and item A is dispensed, the data to be translated into the standard data reporting format would comprise cash increase of $0.60, item A inventory decrease of 1 unit and no fault.

The standard reporting format data is combined with the unique identifier (80) associated with the vending machine, and communicated via communications means (200), such as a modem or other transmitter, to a remote processing center (300) using any of several means, such as radio transmission or modem transmission over telephone lines.

Remote processing center (300) comprises storage means (301) for storing information concerning the inventory status of each vending machine under its supervision, communications means for receiving data from each such vending machine (302), and central processing means (303) for calculating and storing updated inventory information, velocity and routing information.

The data (in standard data reporting format, including an identifier associated with the vending machine) from each vending machine is received by the remote processing center via communications means (302).

The remote processing center maintains a log of received transmissions. Upon receipt of a transmission, the remote processing center extracts sales information and alarm status information and uses such information to periodically update the inventory status of each item at each machine.

If an alarm status is received (or if no communication is received within a preset period of time), an alarm code is generated and appropriate service personnel are dispatched. For example, if a jam code is received, vending machine service personnel would be dispatched; if no communication was received, communication system repair personnel would be dispatched.

The generation of an alarm code if no communication is received within a preset period of time permits the use of less expensive one-way communications rather than two-way communications. Existing systems for transmitting alarm messages, such as the Ademco ALARMNET (™) network, would be suitable for this purpose.

When inventory information is received, it is processed so as to update the current inventory status (i.e., the number of units of each item sold is subtracted from the previous inventory), and the velocity of sales is updated for each item.

Second Preferred Embodiment—Retrofit

In the case of a pre-existing vending machine having 120 VAC or other means for monitoring activity within the machine, it is possible to accomplish the above objectives by retrofitting a universal monitoring interface card (UMIC) assembly. The following describes a prototype of such an assembly.

The unmodified vending machine comprises monitoring points (70) within said vending machine (1), and may include switches and motors indicating product status. Input board (310) is operatively coupled to a CPU (400), which is cooperatively coupled for communication through communications means (200). The input board (310), CPU (400), and communications means (200) are each powered by a low voltage AC power supply (600). In a preferred embodiment, the input board (310), CPU (400), and power supply (600) are snap-together boards that connect through standard 0.1 inch right angle board mount headers and are physically mounted in track or card guides. In such a manner, system (100) can monitor and report activity within a vending machine.

In a preferred embodiment, the CPU (400) is constructed on a circuit board dimensioned as 3.94 inches by 6 inches and constructed of FR-4 laminate with a finished thickness of 0.062 inches and rated UL 94V-0 for flammability. It is a four layer circuit board with an internal ground plane and an internal +5 VDC plane. The two outer layers carry the signal lines and any non-+5 VDC power signals, such as +12 VDC. Since +12 VDC is a low current signal on the board, it is acceptable to route it with moderate sized etch on an outer layer. The board has been designed to be easily manufacturable on an automated through hole line and the hole sizes and etch clearances have been selected to allow easy manufacture of the board itself with a high yield. Component holes have been placed on a standard grid to allow for inexpensive fabrication of a board test fixture.

Figure 3:
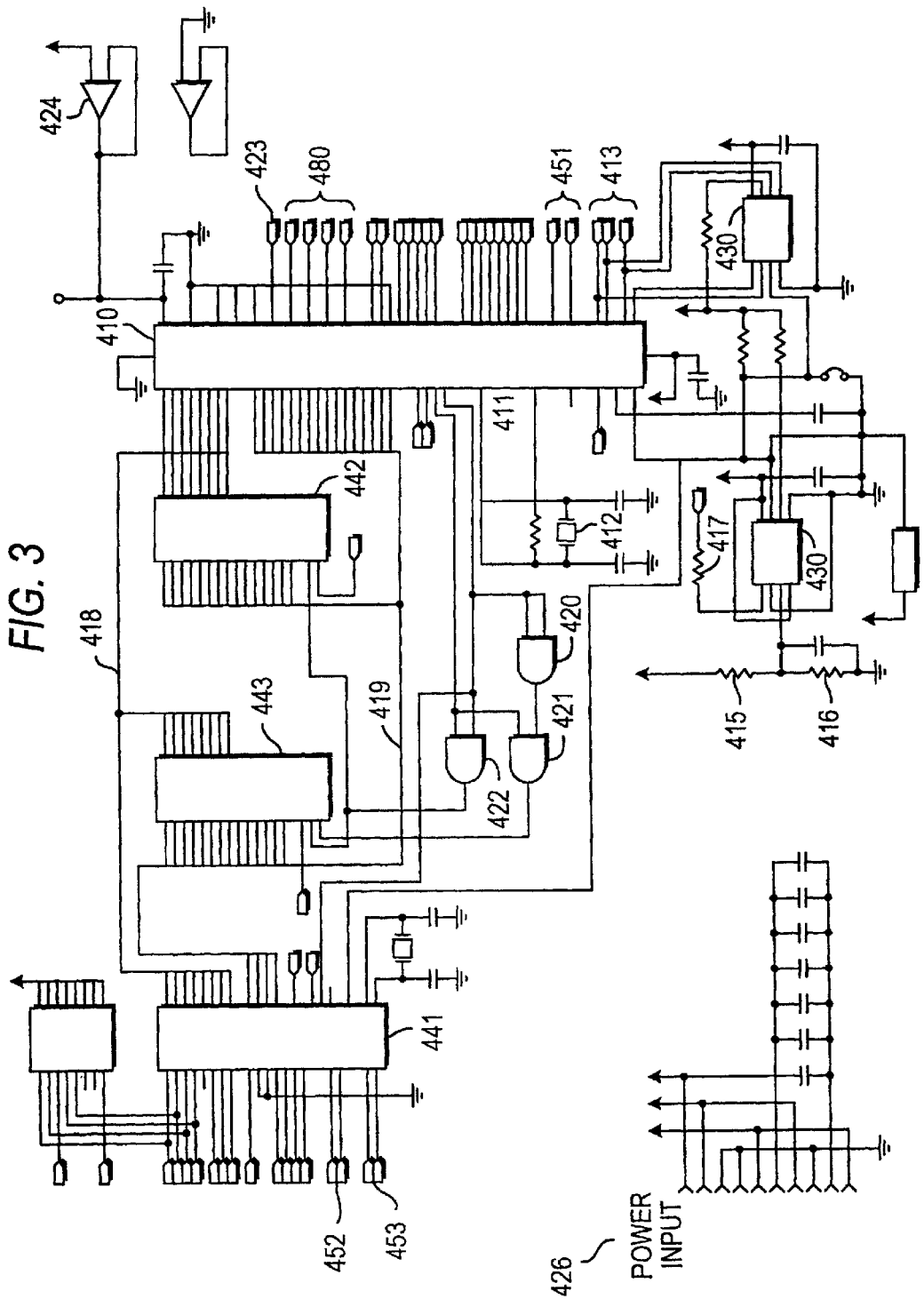
FIGS. 3–11 are schematic diagrams of a prototype system. More particularly.

As is shown in greater detail in FIG. 3, the CPU 400 includes a microprocessor 410. In the preferred embodiment, the microprocessor selected is a MOTOROLA (™) MC68HC11F1FN, which is based on Motorola's standard 68HC11 core and packaged in a 68-pin PLCC.

The microprocessor comprises microprocessor clock (411) driven by an external, parallel resonant 9.8304 MHz crystal (412) in a standard HC-49 welded metal package. The oscillator built into the microprocessor causes the crystal (412) to oscillate at its fundamental frequency and then divides it by four to arrive at a microprocessor logic clock (or system clock, also known as the E clock) of 2.4576 MHz.

The Serial Peripheral Interface (SPI) bus subsystem (413) of the 68HC11 is a clocked serial data port with a send data line, receive data line and clock line all supported on the processor at +5 VDC CMOS levels. The SPI bus (413) provides an interface to the processor's expanded EEPROM (430) and, via the expansion connector (435, shown in detail in FIG. 4), to the input board (310). The SPI subsystem (413) operates as a shift register, with data shifted out of the processor's send data pin (MISO) and into the processor's receive data pin (MOSI) synchronous with the transitions on the clock line (SCK). The bus operates as a master/slave, with the processor as the master and distributor of the clock. Many devices can be hung on the bus, each with its own chip select line. When a device is not selected, it goes tristate, ignoring incoming data and letting its send data line float. When the device is selected, it receives incoming serial data and clock and asserts its output line in order to send data back to the processor.

The microprocessor (410) has reset control to manage the microprocessor "sanity" as it powers up and down. If a processor is specified to run from a supply voltage of no less than +4.75 VDC, then as power fails when the unit is powered down or if low line voltage occurs the processor supply voltage may drop below the specified threshold. Because the processor is running beyond specified limits, erratic operation may occur. To avoid this problem, an external reset controller (414) is used to detect when the processor's supply is below its lower specified threshold and pulls the chip's reset line to prevent erratic operation. In the first preferred embodiment, external reset controller (414) is a MAX690, which provides power fail detect and an external watchdog timer in addition to reset control. In the second preferred embodiment, external reset controller (414) is a MOTOROLA (™) MC34064 small TO-92 package, which provides reset control only.

In the first preferred embodiment, when external reset controller (414) is a MAX690, a power fail detect circuit is designed to generate an IRQ when the unregulated supply voltage (typically 16–23 volts) drops through +12 VDC. At that level, a resistor divider, composed of resistors (415 and 416), sets the input voltage to the PFI pin of the reset controller (414) at +1.3 VDC, which causes reset controller (414) to generate a power fail interrupt out the PFO pin and causes an IRQ to be generated at the microprocessor (410). The main problem with relying on this feature is that when the system is lightly loaded the time from drop of IRQ to RESET will be rather long (tens of ms) but when if the radio is transmitting it will draw the unregulated supply down very quickly and the time from drop of IRQ to RESET will be small.

Microprocessor (410) also has an internal watchdog timer which can be used to monitor the operation of the microprocessor and pull it back from operating improperly, for example due to a static discharge. The internal watchdog can be enabled or disabled by writing a processor register, and its timeout period, based on the system E clock frequency, can be changed based on the values in another internal processor register. When the internal watchdog times out, it does not automatically generate a reset pulse. Instead, it generates an interrupt and starts executing at the location set by the internal watchdog vector. This service routine can, if desired, contain code to initiate a bidirectional hardware reset (executing a STOP instruction with the Clock Monitor Enable bit set).

In one preferred embodiment, when the external reset controller (414) is a MAX690, reset controller (414) can operate as an external watchdog timer to microprocessor (410). Reset controller (414) has a watchdog input pin labeled WDI, which can operate as a watchdog or can disable external watchdog functions. If resistor (417) is omitted, then the WDI input is left floating at whatever level is set in the chip and the external watchdog function is disabled. If resistor (417) is included, then the WDI pin is driven by PG4, pin 4 on port G of microprocessor (410). If resistor (417) is to be installed, then port G pin 4 of microprocessor (410) must be configured as an output when the microprocessor is initialized. If the external watchdog is used, PG4 must toggled every 1.6 seconds or faster in order to keep the reset controller (414) from pulling the hardware reset line and resetting the processor and peripherals.

As shown in FIG. 3, the microprocessor (410) supports an external, non-multiplexed 8-bit data bus (418) and a 16-bit address bus (419) for accessing parallel external memory devices (440). The microprocessor (410) is designed so if there are memory conflicts between memory or registers internal and external memory, then internal always takes priority. Chip enables are driven directly off the processor and read and write lines are derived external to the microprocessor with 74HC00 NAND gates (420, 421, and 422).

Because of the mix of on-chip and off-chip memory types as well as registers available in the processor to relocate blocks of memory, a memory map cannot be accurately presented here. The memory map will be set by software, and because it is software based, it may change from application to application as necessary, subject only to fixed limits that the hardware imposes on whatever memory map is derived.

Examples of devices which may appear in the memory map if desired are: microprocessor internal SRAM (not shown), microprocessor internal registers for configuration (not shown), microprocessor internal EEPROM (not shown), external DUART (441), external EPROM/PROM (442) and external SRAM (443).

In a preferred embodiment, the MC68HC11F1FN microprocessor 410 has 1024 bytes internal SRAM that can be mapped on any 4 k boundary using internal processor registers. If internal SRAM and external SRAM are mapped at the same address, then internal SRAM will be selected because of the priority selection scheme used in the processor.

In a preferred embodiment, the MC68HC11F1FN microprocessor 410 has a 96 byte internal configuration register block that can be mapped on any 4 k boundary. If the configuration register block is located at $1000, then the fixed address space of the DUART (441) and the configuration registers of the microprocessor (410) form a contiguous block, reducing the fragmentation of other types of system memory. Refer to the Motorola MC68HC11F1 Technical Data Book for an explanation of the configuration of these internal configuration registers.

In a preferred embodiment, the microprocessor 410 has 512 bytes of internal 10 k write EEPROM that can be mapped on any 4 k boundary using the internal processor registers. The EEPROM cells are guaranteed for 10 k writes and require an exact register access sequence to allow reprogramming. EEPROM cells can be written or erased individually or can be erased in bulk. Any internal EEPROM location to be written must be erased first, which makes individual location writes to internal EEPROM a time consuming operation.

An external serial EEPROM (430) packaged as an 8-pin DIP provides additional system memory capability. In the preferred embodiment, the EEPROM selected is a 512 byte 2504 or 25040 type part, such as the Ramtron (™) 25040 which is a part implemented with ferroelectric technology. This part has no wait time for programming and an endurance of greater than 10 billion write cycles. The EEPROM (430) handles data in byte increments and requires software commands to perform functions. System functions that are command driven are read data, write data, read status, write status, write enable and write disable. There are a number of variations of this part implemented in different technologies which have a command set that is common. Some of these part types do have software variations.

In a preferred embodiment, the CSIO1 line used to select the DUART (441) is fixed from $1060 to $17FF. Since the DUART 441 only occupies 16 addresses within this range, any contiguous 16 byte block can be selected for use in the program. For example, address $1060 to $106F could be selected, defined up front, then used in the program. However, the content of these locations would repeat every 16 bytes until the ending address of $17FF was reached. So the next usable address after the DUART mapping is $1800.

External EPROM/PROM (442) can be configured to be addressed in a number of ways using internal configuration registers in the processor. If internal memory or registers are mapped in the same address space as external EPROM/PROM, that area of external EPROM/PROM will not be accessible.

In a preferred embodiment, EPROM/PROM (442) is a 64 k byte EPROM or PROM. In the event of a software upgrade, this 28-pin plastic socketed dip would be replaced in the field with the new software and the old chip thrown away. Because of the location of the reset vectors in high memory, program memory is mapped at the high end of the address map.

The chip select for the EPROM/PROM 442 is driven from PG7, Port G pin 7 (also designated CSPROG) of the microprocessor 410. This chip select is asserted low by default, which allows it to be connected directly to the chip enable on the EPROM/PROM (442). When the microprocessor is first powered, it runs the EPROM code by assuming the EPROM is enabled by this line, asserting this line and fetching the instructions to execute. These initial instructions can then be used to remap memory if desired.

External SRAM (443) can be configured to be addressed in a number of ways using internal configuration registers in the processor. If microprocessor internal memory or registers are mapped in the same address space as external SRAM, that area of external SRAM will not be accessible.

In a preferred embodiment, the external SRAM (443) used on the board is 32 k bytes wide with an access time no greater than 120 nS. It is packaged as a 28-pin DIP and follows the normal JEDEC pinout. Because the reset vectors are located above $FF00, the internal EEPROM of microprocessor (410), external EEPROM (430) and EPROM/PROM (442) are usually set at the high addresses and SRAM (443) is set at the low addresses. Since the SRAM part is 32 k bytes wide, it is recommended to configure it at addresses from $0000 to $7FFF. Any internal registers, internal SRAM, or internal EEPROM of the microprocessor 410 mapped into the same space would have priority, effectively making it impossible to get to part of the external SRAM (443) during normal operation.

The SRAM (443) chip select is driven from the PG6 line, Port G pin 6 (also called CSGEN) of the microprocessor (410). This is the microprocessor's general purpose chip select. This functionality of this select line is determined by code executed at microprocessor startup, including memory boundaries over which the chip select operates and asserted state chip select. Since the SRAM (443) is enabled low, CSGEN should be setup to be asserted low.

In a preferred embodiment, the microprocessor (410) has an on-chip 8-bit 8-channel A/D converter (not shown). It has a capacitive redistribution based converter with built in front end sample and hold. As is shown in FIG. 3 and in more detail in FIG. 5, four channels (AN0–AN3) of the converter are used as input channels (480) and a fifth channel (AN5) is used to detect the setting of jumper (423).

The A/D reference voltage consists of the buffered +5 VDC supply. In any mixed technology device, like an A/D converter which has digital +5 VDC levels, analog levels plus an analog reference, there are always concerns for how close the various supply voltages have to be to each other to keep from destroying the converter. For the 68HC11 microprocessor, the high reference voltage is bounded at the lower limit by roughly half the supply voltage and the high reference is bounded at the upper limit because it cannot exceed the +5 VDC supply voltage by more than a few tenths of a volt. So the high A/D reference could be connected directly to the +5 VDC supply and this same supply fed to the world through pull-up resistors on the inputs. However, for robust system design, the reference consists of +5 VDC buffered through an LM358 operational amplifier (424), which itself is supplied from the +12 VDC supply. Using this scheme, the reference voltage will be an exact copy of the supply voltage but the LM358 operational amplifier (424) provides some buffering. Also, the LM358 can source a reasonable current, around 15 mA, so that it can easily supply all current needs on the switched and reference inputs. Since the field devices (thermistors or switches) that may be direct inputs to the microprocessor (410) are all powered by the buffered reference voltage, the system is ratiometric and maintains a high degree of accuracy despite the fact that the reference voltage itself is not absolutely accurate (that is, accurate to some outside calibrated source). The value of an external device on an input is properly expressed as its percentage of full scale operation. In the equation, the reference voltage term cancels. This means that one board can have a reference voltage of 4.90 VDC and another a reference voltage of 5.12 VDC and both will read the same thermistor as 103 counts, for example. Thus there is no need for offset/gain calibration cycles or on-board reference potentiometer trimming.

Some critical registers of microprocessor (410) must be set up to use the internal A/D converter. First, bit 7 (ADPU) of the OPTION register $x039 must be a 1 to power the A/D converter, and bit 6 (CSEL) of the OPTION register $x039 can be set to 0 to use the system E clock. Next, the ADCTL register $x030 must be configured to determine which channels are to be converted. Bit 5 (SCAN) of the ADCTL register $x030 should be cleared to 0 for a single conversion; bit 4 (MULT) of the ADCTL register should be cleared to perform conversions on four channels; and bits 3–0 (CD–CA) of the ADCTL register should all be set to 0 to select AN0–3 to convert. After configuration, a normal sequence will involve writing to ADCTL to start the conversion process, and reading ADCTL bit 7 (CC) until a 1 is read. When a 1 is read, then the A/D conversion results can be read from registers ADR1 to ADR4. ADR1 ($x031) contains counts value for input 480*a* on J2. ADR2 ($x032) contains counts value for input 480*b* on J7. ADR3 ($x033) contains counts value for input 480*c* on J8. ADR4 ($x034) contains counts value for input 480*d* on J9. To get to the configuration jumper 423, it is necessary to reprogram the ADCTL CD bit to 1 and the CC bit to 0 and the result will be available in register ADR1.

Figure 5:
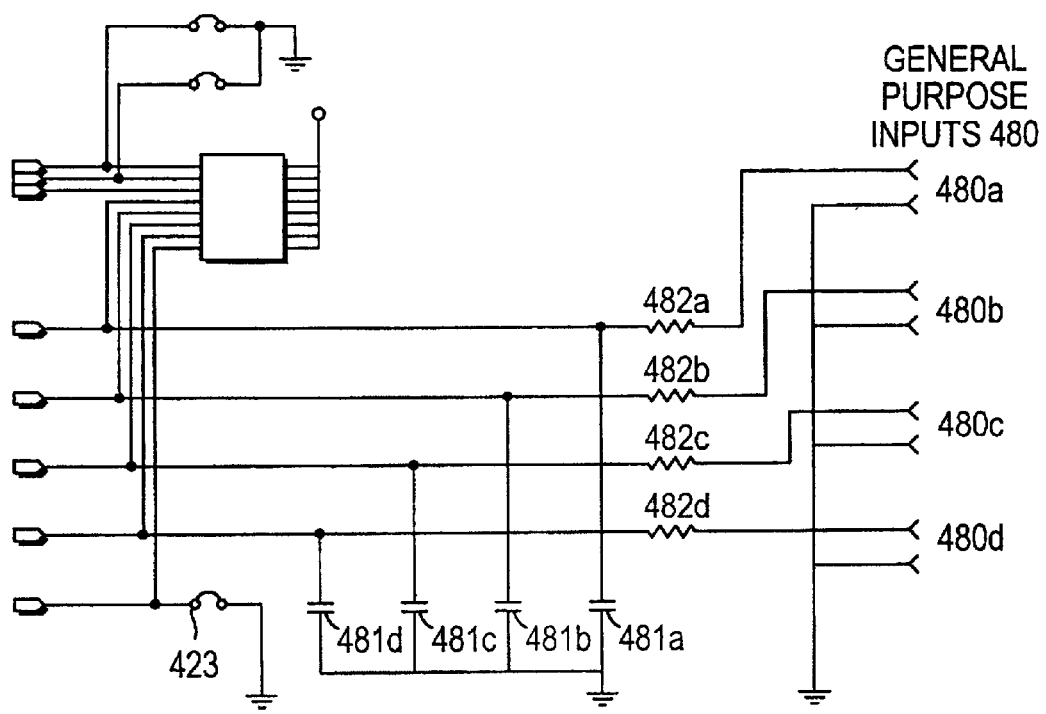

As shown in FIG. 5, the input hardware for all four input channels (480*a* through *d*) is the same. It consists of an optional series with a 0.1 uF capacitor 481*a–d* to ground that forms a weak RC filter with a cutoff at about 150 Hz when the resistor (482*a–d*) is a 10 k ohm resistor. All the input channels (480) are pulled high with 10 k resistors, so this sets the input impedance to roughly 10 k. The input impedance of the A/D converter of the microprocessor (410) is greater than 1 Meg ohm, so the 10 k pull-up dominates and reduces susceptibility to noise. The on-chip A/D has clamp diodes which limit the input voltage, so excursions a few volts beyond the upper and lower reference voltage will not damage the converter.

All of the inputs have on-board pull-ups to the voltage high reference which means that all of the inputs will read full scale counts (0FFH) when left unterminated. Each two position input block consists of an input terminal and a ground terminal. When the two are shorted, the input reads about 00 h counts. The software can be designed to accommodate a normally closed or normally open contact, since both can be easily read on the input. Also, the inputs can operate with a semiconductor device such as an open collector transistor that can sink the current (current is less than 1 mA). Most semiconductor device outputs experience a voltage rise as they sink current. The A/D inputs would necessarily read the input voltage (as setup by the semiconductor device) and set the low threshold higher than this level for the input to be seen as a low. For example, if the semiconductor device sinks 500 uA and the output voltage rises to 4.2 volts from the off state pull-up voltage of +5 VDC, then the change of state on that input will probably not be detected by the microprocessor.

Since all the inputs have identical hardware, all can support thermistors. Thermistor resistance will vary widely, typically from k to k ohms, over a 200 degree Fahrenheit change in temperature. The change of resistance versus temperature, called the characteristic curve, varies based on the materials and process used to make the thermistor. Thermistor selection is somewhat based on the characteristic curve of the device but mostly based on the packaging and mechanical mounting concerns, such as temperature range and packaging tolerance to moisture and humidity.

Because of the ratiometric nature of the input and the fact that thermistors are not linear, some type of conversion must be performed. If they were linear devices, one could simply put the A/D count value read into a "y=mx+b" straight line equation, having hard coded the slope and intercept values. Over a small temperature range of operation the thermistor's non-linearity would not cause appreciable error if approximated with a line.

However, to obtain higher accuracy over a wider range, the conversion from counts read to degrees F can be accomplished with piecewise linear equations or with a lookup table.

As shown in FIG. 5, the setting of jumper (423) may be read at startup exclusively or at any time during the operation of the controller, depending on the application. One possible use for the jumper is to read it at startup (soft or hard reset) to detect whether the controller should run normally or run in a special setup mode. The jumper simply appears as A/D input AN4 (the fifth input) and will be high (near FFh counts) when the jumper is not installed and low (near 00 h counts) when the jumper is installed.

Figure 4:
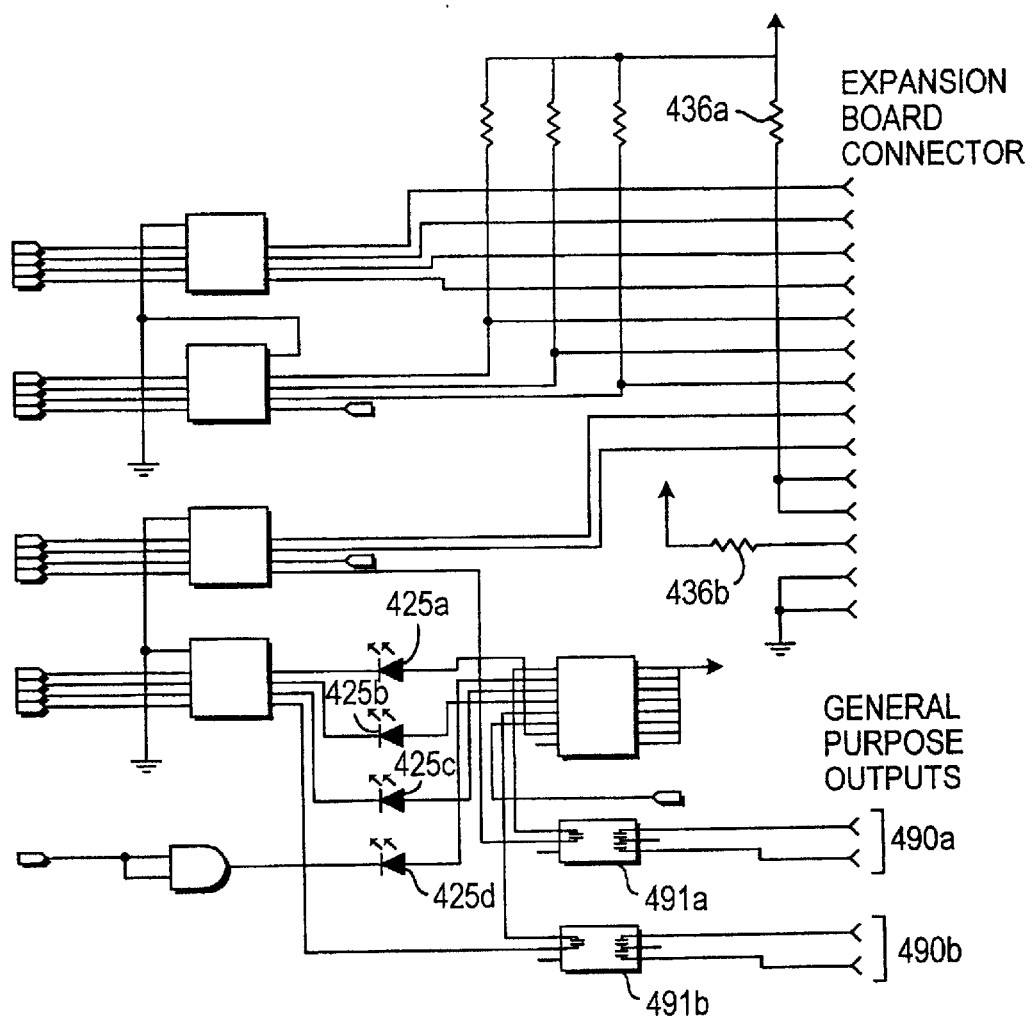

As shown in FIG. 4, the microprocessor (410) has two output points (490) on board brought to two separate connectors. The hardware for these points consists of optically isolated FETs (491*a* and *b*) that can switch to 120 VAC at 130 mA. The FETs appear as high impedance when off and low impedance, effectively connecting the two terminals, when on. Because of the low "ON" resistance, these FETs are also capable of switching low level DC signals. They offer 5 kV of isolation from output to input and are completely independent. One input can be switching 120 VAC while the other can be simultaneously switching +12 VDC at 20 mA.

Since they can switch both AC and DC loads at varying currents, there is no provision made for on board suppression when switching inductive loads. In cases where an AC voltage is switched, an appropriate suppression device would be a varistor of the appropriate rating, used across the terminals of the field device. Where DC is switched, either a varistor or a diode would be suitable. While the suppression device can be used across the contacts at the terminals of the output point, it will be much more effective if placed directly on the field device.

The output points (490) are driven directly from pins of the microprocessor (410). Output (490*a*) (J11) is driven from PA7, so PA7 must be configured as an output. Writing PA7 to a 0 causes output 490*a* to be on, or to have a low "ON" resistance between J11's terminals. Output (490*b*) (J10) is driven from PA6. Writing PA6 to a 0 causes Output (490*b*) to be on, or to have a low "ON" resistance between J10's terminals.

Figure 6:
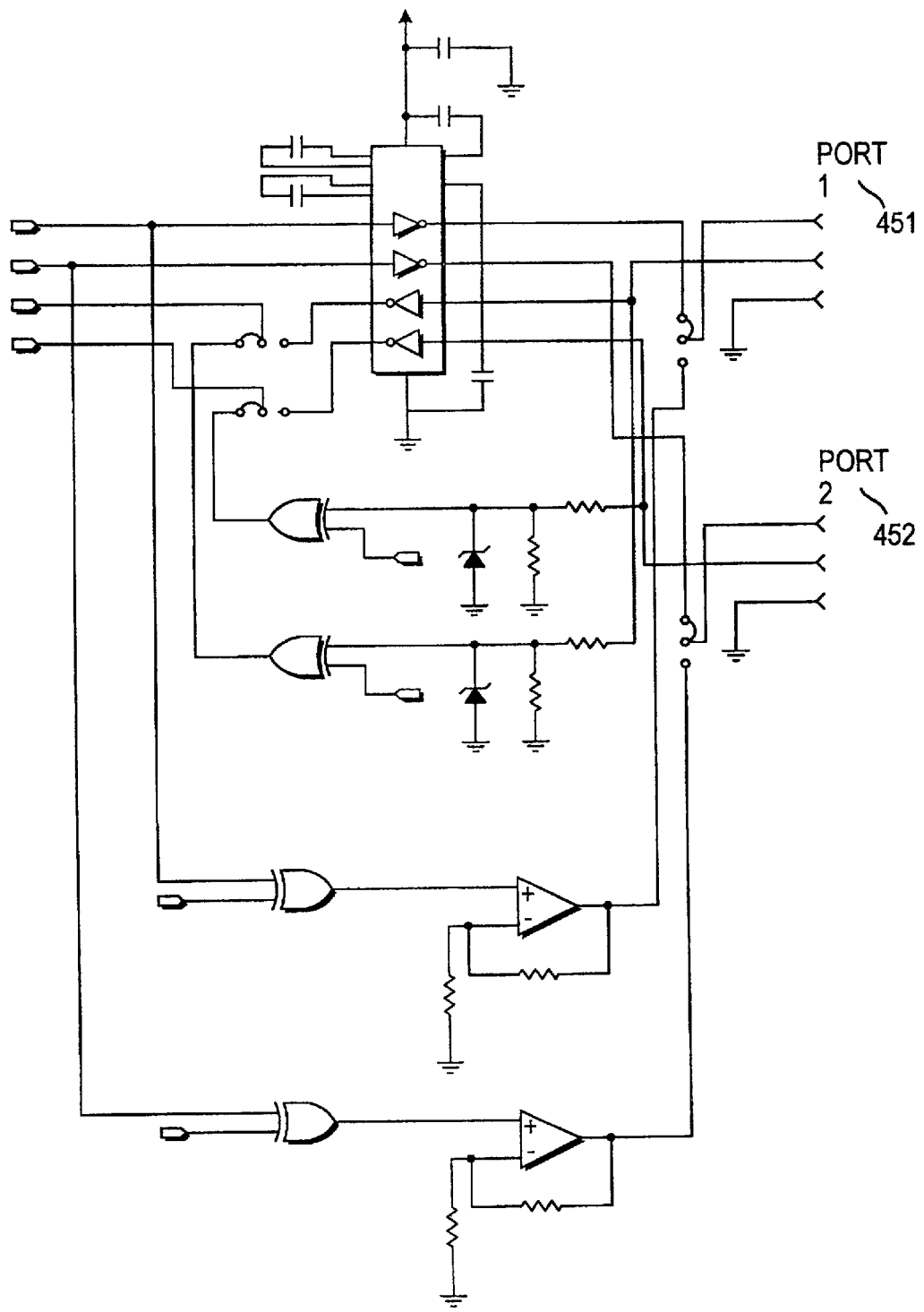
Figure 7:
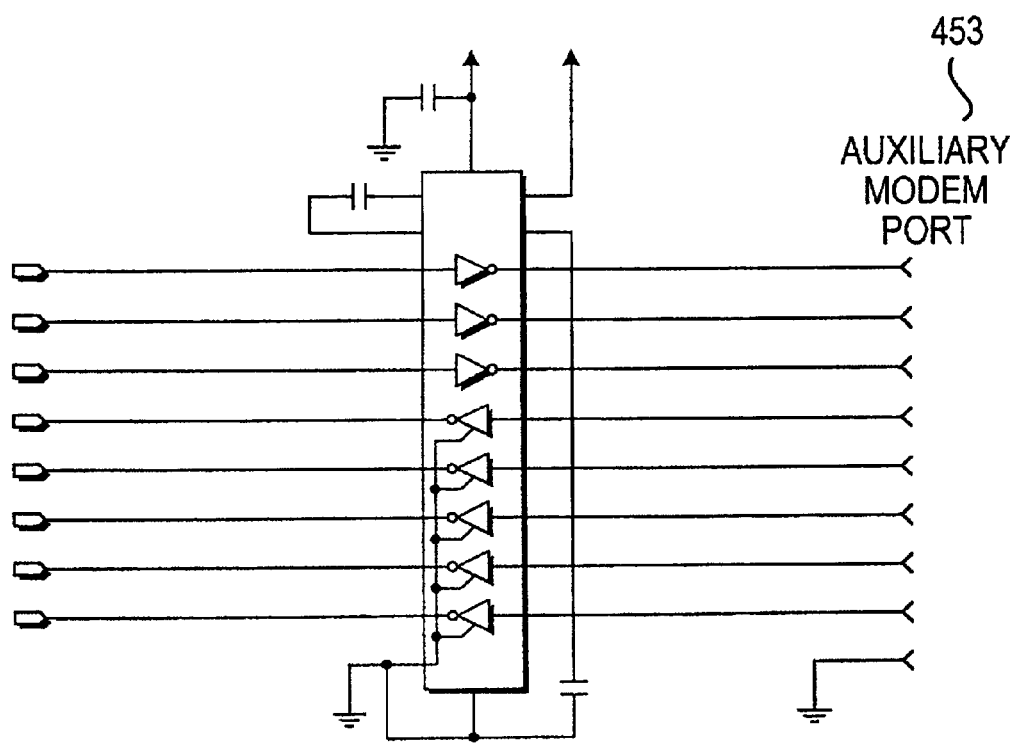

As shown in detail in FIGS. 6 and 7, the system has several data communications ports. One data port (451) connects to the internal UART of microprocessor 410. Two other data ports (452 and 453) connect to an external DUART (441). Data port (451), which in a preferred embodiment is configured for DEX communication with a coin mechanism, appears at physical connector J6 on the CPU board as shown in FIG. 6. The connector itself is a three pin locking, polarized MOLEX (™) style connector with pins on 0.1 inch centers. Three lines are supported: TXD, RXD and GND.

The interface of data port (451) can be independently configured for +5 VDC/0V levels with data inverted or not inverted (invert/non-invert decision is under software control), +12 VDC/0V levels with data inverted or not inverted, or real RS-232 levels with non-inverted data only. The invert/not invert decision is handled by asserting or de-asserting an output pin on the DUART 441, with one pin dedicated to each channel (pins are labeled POLSW1 and POLSW3). For a single channel, transmit and receive invert as well as transmit and receive voltage levels are independent. The actual output voltage, +5 VDC or +12 VDC or something between, is set by the resistors associated with each operational amplifier in each transmit path. If POLSW1 is low, then the data transmitted out data port (451) is not inverted. If POLSW1 is high, then the data transmitted out data port (451) is inverted. If POLSW3 is low, then the data received (with non-RS-232 levels) at data port (451) is not inverted. If POLSW3 is high, then the data received at data port (451) is inverted. The POLSW1 and POLSW3 lines will need to be initialized at startup before any data is sent out either data port (451) or data port (452).

The logical side of data port (451) connects directly to the UART transmit and receive lines of microprocessor (410). The data is timed by the microprocessor crystal and is configurable at most common baud rates from 300 baud to 38400 baud from registers internal to the processor. Data is supported at 8 bits and 9 bits (in 9th bit multiprocessor wake up mode) but creating data with a parity bit is not supported in hardware and difficult to do in software. Data port (451) can run with all interrupts disabled, receive interrupts enabled, and/or transmit interrupts enabled. Data port (451) also has the requisite overrun and framing error detection flags as well as a noise flag. Also, the port can be forced to break (transmit line low instead of high at idle) and also can generate an interrupt on reading a break. Note that when working with high speed data and receive interrupts enabled, the interrupt latency for the 68HC11 is fairly long because of all of the status bytes and registers it pushes on the stack at interrupt time. Also, this port is single buffered only, which may cause the system to get pulled down if high speed data enters on this port and causes a large number of interrupts.

Data port (451) will typically be configured for DEX communication with a coin mechanism and will operate at +5 VDC levels. For +5 VDC output, the following configuration may be used:
XOR gate 454b Installed
XOR gate 454c Installed
Op amp 455b Installed
Resistor 456f 1.21 k ohms
Resistor 456e Not installed
Resistor 456d 0 ohms
Resistor 456c Not installed
JP5 1–2 shorted
JP7 2–3 shorted For +12 VDC output, the following configuration may be used:
XOR gate 454b Installed
XOR gate 454c Installed
Op amp 455b Installed
Resistor 456f 1.21 k ohms
Resistor 456e Not installed
Resistor 456d 10 k ohms
Resistor 456c 7.15 k ohms
JP5 1–2 shorted
JP7 2–3 shorted For RS-232 levels, the following configuration may be used:
Inverter 457 Installed
Resistor 456f Not installed
Resistor 456e Not installed
Resistor 456d Not installed
Resistor 456c Not installed
JP5 1–2 shorted
JP7 2–3 shorted The microprocessor UART has three configuration registers associated with it plus one status register and one data register. The configuration registers should be setup as follows:

All bits of register SCCRI ($x02C) are 0 for most applications.

In register SCCRI ($x02D), bits 7–2 for interrupts and enables should be set as desired; bit 1 should be 0 for normal operation; and bit 0 should be 0 for normal operation. In register BAUD ($x02B), bit 5 should be 1 and bit 4 should be 0 for master divider. Bits 2 to 0 can be configured for the following baud rates:

| Baud | Bits 2:0 |
|---|---|
| 38400 | 0 0 0 |
| 19200 | 0 0 1 |
| 9600 | 0 1 0 |
| 4800 | 0 1 1 |
| 2400 | 1 0 0 |
| 1200 | 1 0 1 |
| 300 | 1 1 1 |

Data to be sent can be written to register SCDR $x02F when bit 7 (TDRE) of SCSR ($x02E) is a 1, indicating that the transmitter is ready to accept more data. When SCSR bit 5 (RDRF) is a 1, it means that a received character is ready to be read from SCDR. SCDR has alternate functions for read and write.

Data port 452, which in a preferred embodiment is configured for radio communication, appears at physical connector J3 on the CPU board as shown in FIG. 6. The connector itself is a three pin locking polarized Molex style connector with pins on 0.1 inch centers. Three lines are supported: TXD, RXD and GND.

The interface of data port (452) can be independently configured for +5 VDC/0V levels with data inverted or not inverted (invert/non-invert decision is under software control), +12 VDC/0V levels with data inverted or not inverted, or real RS-232 levels with non-inverted data only. The invert/not invert decision is handled by asserting or de-asserting an output pin on the DUART (441) with one pin dedicated to each channel (pins are labeled POLSW2 and POLSW4). For a single channel, transmit and receive invert as well as transmit and receive voltage levels are independent. The actual output voltage, +5 VDC or +12 VDC or something between, is set by the resistors associated with each operational amplifier in each transmit path.

If POLSW2 is low, then the data transmitted out data port (452) is not inverted. If POLSW2 is high, then the data transmitted out data port (452) is inverted. If POLSW4 is low, then the data received (with non-RS-232 levels) at data port (452) is not inverted. If POLSW4 is high, then the data received at data port (452) is inverted. The POLSWX lines will need to be initialized at startup before any data is sent out either data port (451) or data port (452).

The logical side of data port (452) connects to Port B on the DUART (441), which is a 68681. The DUART port has some advantages over conventional UARTS. The DUART clock is driven by a separate crystal for the DUART which makes it independent of the processor crystal/clock. The port supports baud rates from 50 baud to 115200 baud. To reduce interrupt traffic when running high speed data, the port has a four byte receive buffer and a two byte transmit buffer. It supports character lengths from 5 to 8 bits and parity. It can be set to interrupt the processor when there is one character in the buffer or when the buffer is full (four characters). Although interrupt sources are selectable in the DUART, there is only one interrupt line from the DUART to the processor on IRQ. The software must sort through possible interrupt sources while in the IRQ routine to determine who caused the interrupt.

Data port (452) will typically be used to communicate with an ADEMCO (™) radio and will be configured to operate at +12 VDC levels. For +5 VDC output, the following configuration may be used:

XOR gate 454a Installed
XOR gate 454d Installed
Op amp 455a Installed
Resistor 456h 1.21 k ohms
Resistor 456g Not installed
Resistor 456b 0 ohms
Resistor 456a Not installed
JP6 1–2 shorted
JP8 2–3 shorted For +12 VDC output, the following configuration may be used:

XOR gate 454a Installed
XOR gate 454d Installed
Op amp 455b Installed
Resistor 456h 1.21 k ohms
Resistor 456g Not installed
Resistor 456b 10 k ohms
Resistor 456a 7.15 k ohms
JP6 1–2 shorted
JP8 2–3 shorted For RS-232 levels, the following configuration may be used:

Inverter 457 Installed
Resistor 456h Not installed
Resistor 456g Not installed
Resistor 456b Not installed
Resistor 456a Not installed
JP6 1–2 shorted
JP8 2–3 shorted In a preferred embodiment, data port (453) is configured as a PC compatible 9-pin male D-sub at RS-232 levels with all lines supported, as shown in FIG. 7. The connector is a straight up plastic shell type located on the CPU board. The logical side of data port 453 connects to Port A on the DUART (441).

Data port (453) is configured as a DTE (data terminal equipment) exactly the same as a PC serial port. The software should cause the port to behave like a PC serial port. Common definitions are as follows:

| Pin Name | TTL voltage level | Comments |
| --- | --- | --- |
| 1 DCD - Data Carrier Detect | Read 0 V when carrier detected | Input to system from external modem to indicate that another data modem is online and connected |
| 2 RXD - Receive Data | Read +5 V when idle | Input to system from external modem |
| 3 TXD - Transmit Data | Set to +5 V when idle | Output from system to external modem |
| 4 DTR - Data Terminal Ready | Set to 0 V when ready | Output from system to external modem to indicate system is powered; usually paired with DSR |
| 5 GND - Ground | | |
| 6 DSR - Data Set Ready | Read 0 V when modem ready | Input to system from external modem to indicated external modem is powered; usually paired with DTR |
| 7 RTS - | Set to 0 V to | Output from system to |

-continued

| Pin Name | TTL voltage level | Comments |
| --- | --- | --- |
| Request to Send | request | external modem that is the hardware handshake line to control the modem's transmit data |
| 8 CTS - Clear to Send | Read 0 V when modem ready | Input to system from external modem that is the hardware handshake line to allow external modem to control system's transmit data |
| 9 RI - Ring Indicator | Read 0 V when ring detected | Input to system from external modem to indicate that the modem is being called or receiving data transfer initiation information at its correct address |

Data port (454) handshake lines consist of a number of inputs and outputs which are connected to the DUART I/O ports. DUART input state can be determined by reading the DUART register INPUTP ($x06D). The register exactly reflects the state of the input, so if the DUART input pin is +5 VDC then the bit location associated with that input will read as a 1. Data port (453) CTS is read on bit 0, DSR is read on bit 1, RI is read on bit 2 and DCD is read on bit 3.

The following illustrates a quick setup/usage example for the DUART.

The following sequence should be performed to initialize both DUART ports for 9600 baud, 8 bits and 1 stop bit:

| | |
| --- | --- |
| Store $70 to ACR ($x064) | This sets the baud rate generator to derive its clock from the crystal frequency of ). 6864 MHz divided by 16. |
| Store $BB to CSRA ($x061) and to CSRB ($x069) | This sets the baud rates for both channels to 9600 baud. |
| Store $1A to CRA ($x062) | This resets the MR pointer so the next write is to MR1A. |
| Store $13 to MR1A ($x060) | This sets the parity to none and number of bits to 8 for DUART channel A. |
| Store $07 to MR2A ($x060) | A write to MR2A must always and only follow a write to MR1A. This sets the channel mode to normal and stop bit length to 1. |
| Store $1 A to CRB ($x06A) | This resets the MR pointer so the next write is to MR1A. |
| Store $13 to MR1 ($x068) | This sets the parity to none and number of bits to 8 for DUART channel B. |
| Store $07 to MR2B ($x068) | A write to MR2B must always and only follow a write to MR1B. This sets the channel mode to normal and stop bit length to 1. |
| Store $05 to CRA | This enables the DUART A channel transmitter and receiver. |
| Store $05 to CRB | This enables the DUART B channel transmitter and receiver. |

The DUART register structure resembles any other serial subsystem. A status register can be read until a particular bit indicates that the transmitter is ready to accept another character to be sent. Then the bit is loaded into that register and the hardware handles the transmission. For Port A, register SRA ($x061) bit 2 (TXRDY) can be read and if it is a 1 this indicates that the next character to be transmitted can be loaded to THRA ($x063). For Port B, register SRB ($x069) bit 2 (TXRDY) can be read and if it is a 1 this indicates that the next character to be transmitted can be loaded to THRB ($x06B).

The DUART receive operates as follows. A bit in a register can be read to determine if a valid character has been received. Then a separate character register can be read to retrieve the data and this process automatically clears the character ready bit. For Port A, register SRA bit 0 (PXRDY) can be read and if it is a 1 this indicates that a character is ready to be read from RHRA ($x063). For Port B, register SRB bit 0 (RXRDY) can be read and if it is a 1 this indicates that a character is ready to be read from RHRB ($x06B).

As is shown in FIG. 4, located on the CPU are LEDs (425a–d), all under microprocessor control. The LEDs can he used as status indicators. LEDs (425a–c) are driven through a buffer from PA3, PA4 and PA5 on the microprocessor 410. The PA pins must he configured as outputs in order to control the LEDs. The pins should also he directly under control of the software, so none of the internal processor timers should he setup to be associated with the driving pins on this port. The LEDs are driven by sinking the current, so to turn one of these LEDs on, a one (+5 VDC level) must be written to the appropriate output pin. The LEDs are low current (4 mA) types which can be directly driven from an HCMOS output sinking current.

LED (425d) is driven from output pin OP2 of the DUART 441. Once the DUART is configured, writing two DUART internal registers, Set Output Port Bits ($x06E) and Reset Output Port Bits ($x06F) causes the output port pin to change state. These registers function much like a flip flop. Writing a "1" to a bit position in the Set Output Port Bits register will cause that hit position in the DUART internal OCR (output control register) to be a 1, in turn making that output pin a "0" or low voltage. Writing a 1" to a bit position in the Reset Output Port Bits register will cause that bit position in the DUART internal OCR to he a "0", in turn making that output pin a "1" or high voltage. Note the inversion from the commanded Set/Reset to the actual state of the output pin.

As shown in FIG. 3, the CPU board gets power through the power connector (426) at J1. It is a male 10-pin dual row right angle header that carries the +5 VDC line, the +12 VDC line and VUNREG (pre-regulated input) to the CPU. The power supply should not be powered as the CPU and power supply board are engaged because there is no physical pin configuration that sets power up sequence. Plugging the CPU into a live power supply runs the risk of latch up or other power up problems.

The low voltage AC power supply (600) interfaces directly to the CPU board (410) and provide power to the CPU over an interface connector. Additionally, the power supply (600) provides external power for outboard devices such as a dial up modem and radio modem.

The low voltage AC power supply board (600) circuitry may be constructed on a circuit board dimensioned as 3.94 inches by 3 inches and constructed of FR-4 laminate with a finished thickness of 0.062 inches and rated UL 94V-0 for flammability. It is a two layer circuit board with blue solder mask on both sides and white silkscreen on the component side. Component symbols and hole sizes on the board have been designed to be easily hand manufacturable. Component holes have been placed on a standard grid to allow for inexpensive fabrication of a board test fixture.

Figure 8:
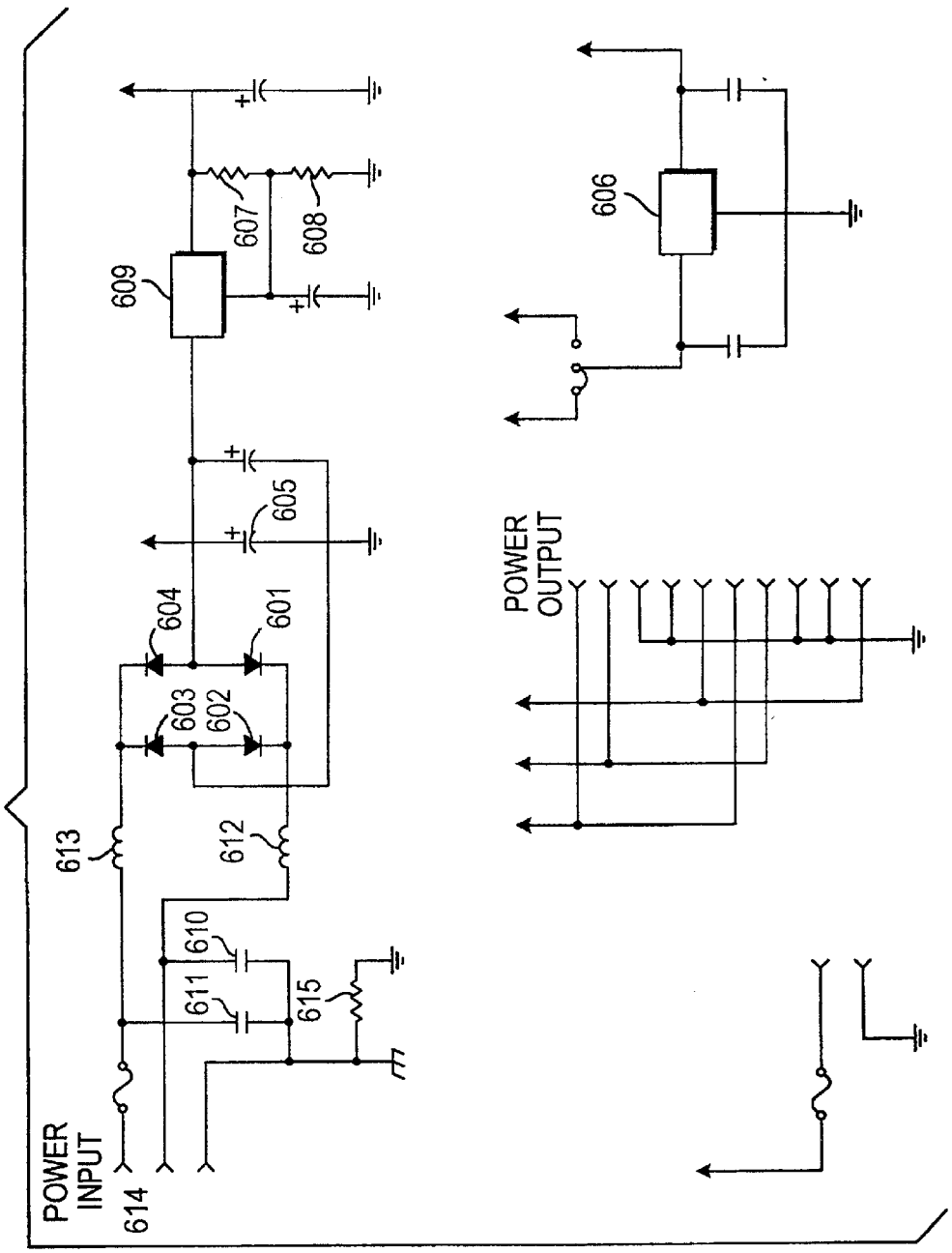
Figure 9:
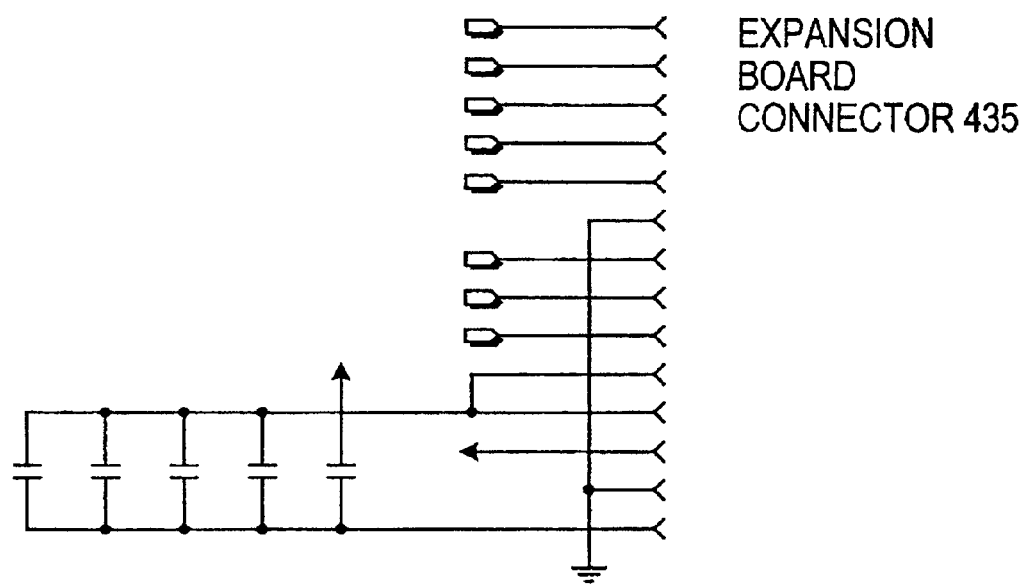
Figure 10:
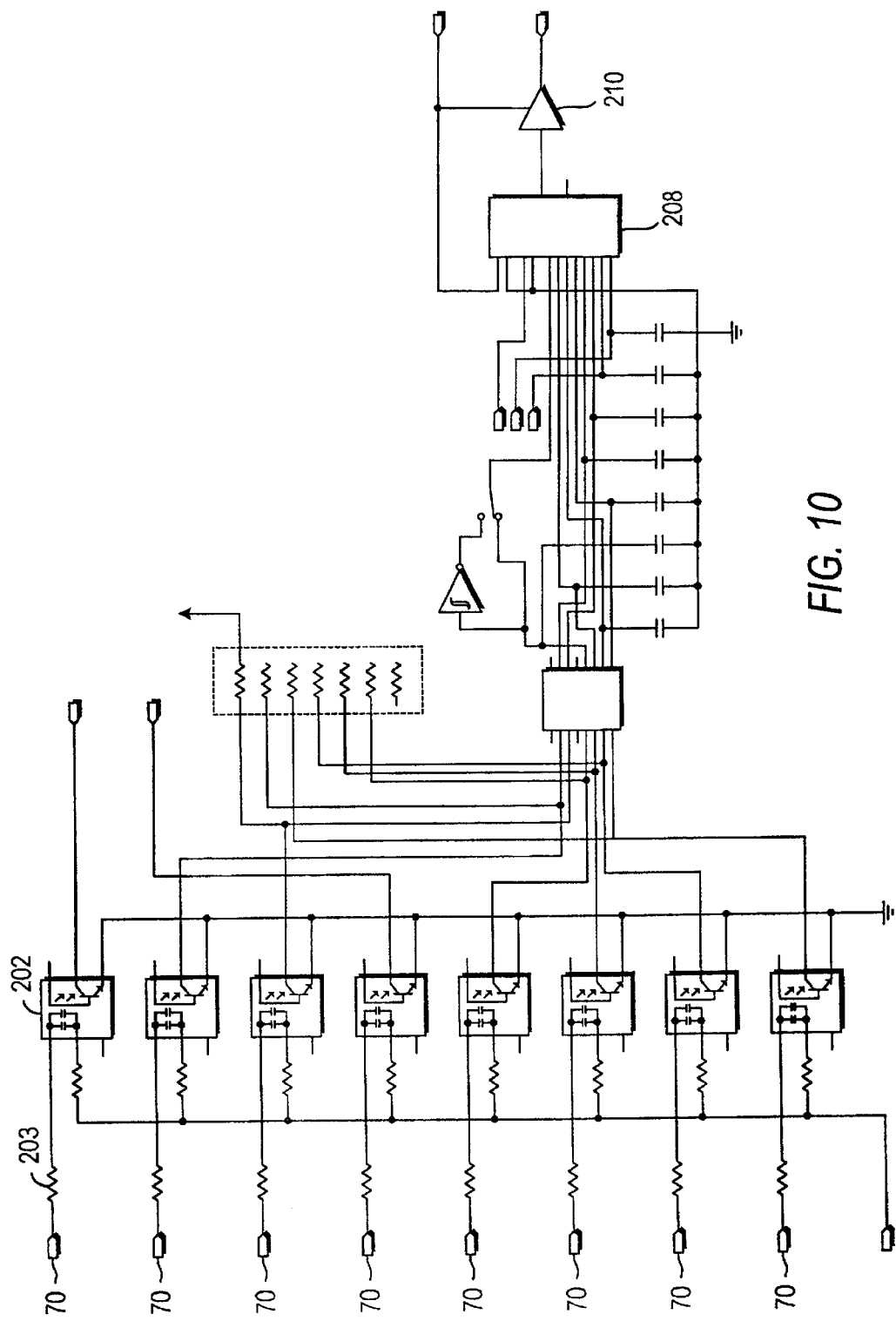
Figure 11:
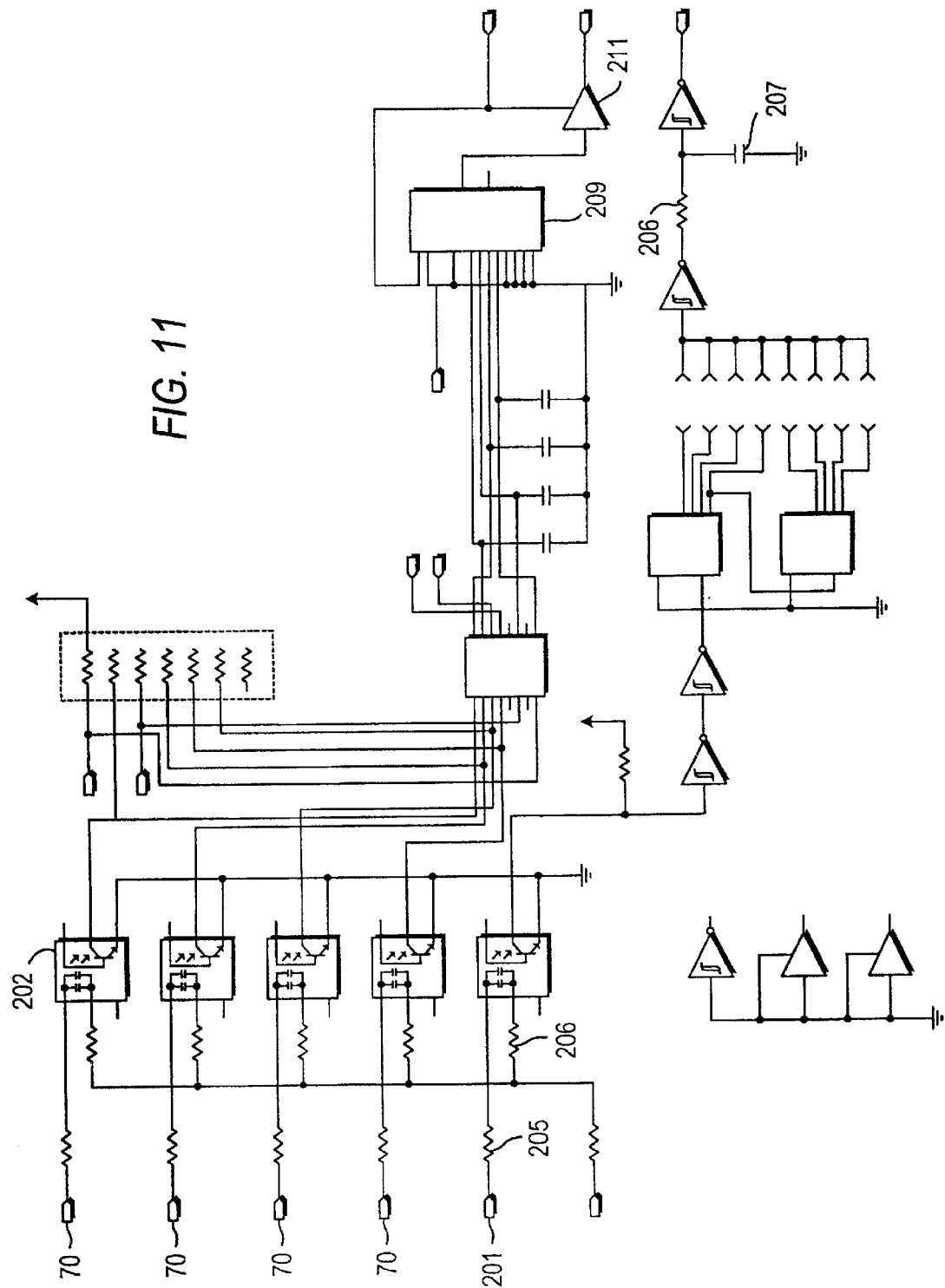

As is shown in FIG. 8, the power supply (600) is designed to be powered by an AC input voltage, but can also be used with DC under appropriate circumstances. Input power is supplied by a UL/CSA recognized external step down transformer that would convert the 117 VAC rms line voltage to the voltage necessary to derive the required DC output voltage. For example, when the variable high current supply is set at +12 VDC for an output current of 2 A, then the AC input required is 16.5 VAC rms. Other AC input DC output combinations are possible and can be accommodated on an individual application basis. The actual AC input terminals are located on J2 and are both labeled AC.

Four diodes, (601–604), rated at 3 A are used in a bridge configuration at the input. The bridge configuration allows the use of an external step-down transformer without a center tap. Also, since the bridge is a full wave rectifier, a smaller filter capacitor can be used despite the high output current. Etch placed directly under the diodes as part of a limited ground plane on the component side also serves as a heat sink. The forward drop across each of the diodes when running their full rated current is 1.1 VDC.

A large aluminum electrolytic filter capacitor (605) is used on the supply input in order to smooth the rectified DC to maintain a proper voltage into the regulators at maximum current draw. When the variable output is set to +12 VDC, it is necessary to maintain a minimum voltage into the regulator of +14 VDC. With a 3300 uF capacitor rated at 50 VDC for the main filter, at the maximum load of 2 A this yields a ripple of 5 VDC. This dictates that the input to the filter must be at least 19 VDC at peak. The ripple and thus the input voltage could be reduced at the expense of increasing the input filter capacitor substantially in size and cost.

The capacitor selected as filter must also be designed to withstand the heating effects of current surging through it and still operate to the product's designed lifetime. The amount of heat generated is determined by the capacitor's equivalent series resistance. A related parameter is the capacitor manufacturer's specified ripple current rating at a particular temperature. A capacitor with a ripple rating of greater than 2.5 A at 85 degrees C. is necessary in this design. If the capacitor is operated at higher than its rated ripple voltage at a specified temperature for a long period of time, the heat generated in the capacitor will cause the electrolyte in the capacitor to evaporate, the capacitor will fail, and soon after the product will fail.

The +5 VDC regulated output voltage is set by a fixed three terminal 7805 TO-220 packaged regulator (606). The regulator is heat sinked so it will operate properly with an approximate maximum draw of 700 mA while keeping the 7805 junction temperature below 70 degrees C., which is well below its maximum 125 degree C. rating. In addition, all 7805 regulators have a built in thermal shut down so if the regulator becomes too hot due to a circuit failure, it will cease to supply current until it cools down.

The variable output supply is set by resistors 607 and 608 and adjustable regulator (609), which can be configured to provide output over a wide range, with the output typically set at +12 VDC. The supply is designed to deliver a fixed voltage at high current to an external device, such as an RF modem. The device is heatsinked to allow a maximum constant current draw of 2 A without the device overheating. At 2 A draw, the junction temperature on the regulator is acceptable at about 70 degrees C., well below the 125 degrees C. limit. Power is delivered both to the CPU board to be used in some analog circuitry and to an external device, such as a modem, through the screw terminal block at J3.

A small power line filter has been constructed on the board using discrete components 610–613. This low pass filter reduces the ability of power line noise to get into the supply and ultimately cause operational problems at the CPU. Also, this filter helps to reduce the amount of CPU generated noise that passes through the power supply and would be conducted onto the AC line. CPU generated power line noise must be kept to a minimum in order to meet FCC conducted emissions requirements for digital devices.

The third terminal on the J2 block on the board is the EGND (Earth ground) terminal 614, which is designed to accommodate a connection to green wire ground from the local AC distribution system. EGND can be connected to circuit ground by populating the 615 resistor location with a zero ohm resistor. EGND is a convenient place for the input filter to dump noise energy and should be wired to keep the system operating reliably.

AC power is supplied from an external transformer to the AC inputs at the screw down terminal block at J2. The connector that connects the supply to the CPU is a 10-position two-row 0.1 inch spaced 0.025 inch pin socket. It provides a positive locking feel when the supply board and CPU engage properly. It is designed to allow the boards to slide together easily along track or card guides.

As is shown in FIG. 4, the CPU (400) has an expansion connector (435) designed to accommodate I/O devices such as discrete inputs and outputs, a real time clock, as well as A/D converters, D/A converters and their necessary conditioning circuitry. In particular, the expansion connector is an interface between the SPI bus (413) of the microprocessor (410) and the input board (310).

The expansion connector extends the system +5 VDC supply at relatively high current capability (hundreds of mA) and +12 VDC at low current (tens of mA). The +5 VDC line can power logic on the expansion board and the +12 VDC line can be used as an analog supply, possibly to bias operational amplifiers for signal conditioning. A common ground return is also presented at the connector. Resistors (436a and 436b) can be populated with current limiting resistors in order to protect the CPU board power from drastic failures on an expansion board.

The expansion connector (435) supports a buffered SPI bus interface (413) driven directly from the processor. The SPI bus is a processor based synchronous data bus with one send data line, one receive data line and one processor driven clock line. It can interface to multiple SPI bus peripherals on the expansion card if a separate output line is used as a select line for each SPI device. Typical peripheral devices that support a SPI bus interface include EEPROMS, A/D converters, D/A converters, real time clocks and general purpose I/O devices.

Expansion connector (435) supports six discrete signal lines, four outputs and two inputs. The outputs are driven from PG0 to PG4 directly off the processor and HCMOS buffered. They have no timers associated with them on the CPU and would typically be used as select lines for external SPI bus peripherals or to implement a small number of outputs with no intervening select or multiplex chips. The inputs are HCMOS buffered after they arrive on the CPU board and then drive PA0 and PA1 processor input lines directly. PA0 and PA1 can be configured as general purpose inputs or inputs that generate interrupts on rising or falling edges. They can be left unterminated as they are pulled up on the CPU board.

In a preferred embodiment, the input board (310) supports points that connect directly to line voltage, so it is important to select devices that provide appropriate isolation. In a preferred embodiment, optocouplers (202) are used because they provide more than adequate protection (typically greater than 2500 VAC) and are small in size, low cost and available from a number of vendors.

In any monitoring application, the main concern (beyond safety) is the ability to actually read the input status. A preferred optocoupler, the H11AA1, has back to back LEDs internally to detect both the positive and negative going transitions of the AC wave. Current limiting resistors (203) and (204) are used in series with the optocouplers (202) to limit the current through the diodes. In a preferred embodiment, resistors (203) and (204) are half watt resistors sized so that the nominal LED current is reached at about 70V. The "always on" synch input (201) has slightly larger resistors so it will turn on slightly after the other inputs. By sampling the inputs slightly after the synch input triggers, the AC voltage will be read at its peak and the proper AC voltage status will be read. Using this scheme, the resistors are large so they do not dissipate much heat. Because they are not dissipating much heat, making them half watt type affords a large safety margin.

The expansion connector (435) is a 14-position Molex Mini-Fit style with locking tabs to allow it to easily pass through the wave soldering process without the need to add mounting hardware. It is mounted in the center of the board with minimum runs to the high side of the optocouplers. It has been optimally placed on the board with optocouplers around it to isolate the AC line voltage carrying etch to an area bounded by an imaginary line drawn through the center of each optocoupler.

The pinout for the 14-pin connector is as follows:
Pin Number Signal
1 120 VAC Input 1
2 120 VAC Input 2
3 120 VAC Input 3
4 120 VAC Input 4
5 120 VAC Input 5
6 120 VAC Input 6
7 120 VAC Hot
8 120 VAC Input 7
9 120 VAC Input 8
10 120 VAC Input 9
11 120 VAC Input 10
12 120 VAC Input 11
13 120 VAC Input 12
14 120 VAC Neutral The synchronous reference input is at pin number 7 on the AC interface connector and is required to be wired to a 120 VAC hot line in the machine which is always powered. This line provides a reference edge a predictable distance from the zero crossing which is the signal for the processor to read all the inputs. This input is sensed, squared, and divided by circuitry on the AC input board. J1 is the jumper header that allows the interrupt rate to be selected. The minimum hardware configurable setting, for interrupt rate is 16.6 Hz with J1-1 and J1-2 shorted. Next follows 33.2 Hz for J1-3 and J1-4 shorted and so on up to a sample every 2.2 seconds with J1-15 and J1-16 shorted. Additional edge can be added using resistor 206 and capacitor 207 as necessary with the resulting signal appearing on the microprocessor's PA0 input. The microprocessor should be setup to interrupt and sample on the signal's falling edge.

Point data for the input card is read over the processor's SPI bus (413) when the read data interrupt signals that a read should occur. The AC point status information is conditioned on the AC card and appears at 74HC165 parallel to serial converters (208 and 209). These devices will send data present at their inputs out a single serial data line in synchronization with the processor issued clock. However, because these devices are not tristate so will not share the bus with other devices, 74HC126 tristate devices (210 and 211) are added. Since in the preferred embodiment the board has 12 inputs (8+4), they are supported on two serial parallel chips and two gates on the tristate device. To read point data from the first eight points, processor line PG0 would be driven high from its normally low state and the SPI subsystem (413) could shift out a dummy byte. The byte read in during the shift would represent the status of the AC inputs. Then the PG0 line would be returned to its normally low state.

To read the next four inputs, the PG1 line would be driven high from its normally low state and the SPI subsystem (413) could shift out a dummy byte. These four inputs would be read back as bits 0–3 of the returning byte; bits 4–7 should always read back as zero since they are grounded on the input to the parallel to serial converter (209). Then the PG1 could be returned to its normally low state.

Note that the above prototype is independent of the original vending machine type (requiring only that it contain components suitable for use as monitoring points) and of network type. Although modifications might be required to conform to specific network protocols, the serial interfaces to the vending machine are fixed, and the data collected and transmitted is independent of network or machine considerations.

Third Preferred Embodiment—Prototype of Space to Sales

The following prototype was constructed to highlight and demonstrate the scheduling features of the invention.

Figure 12A:
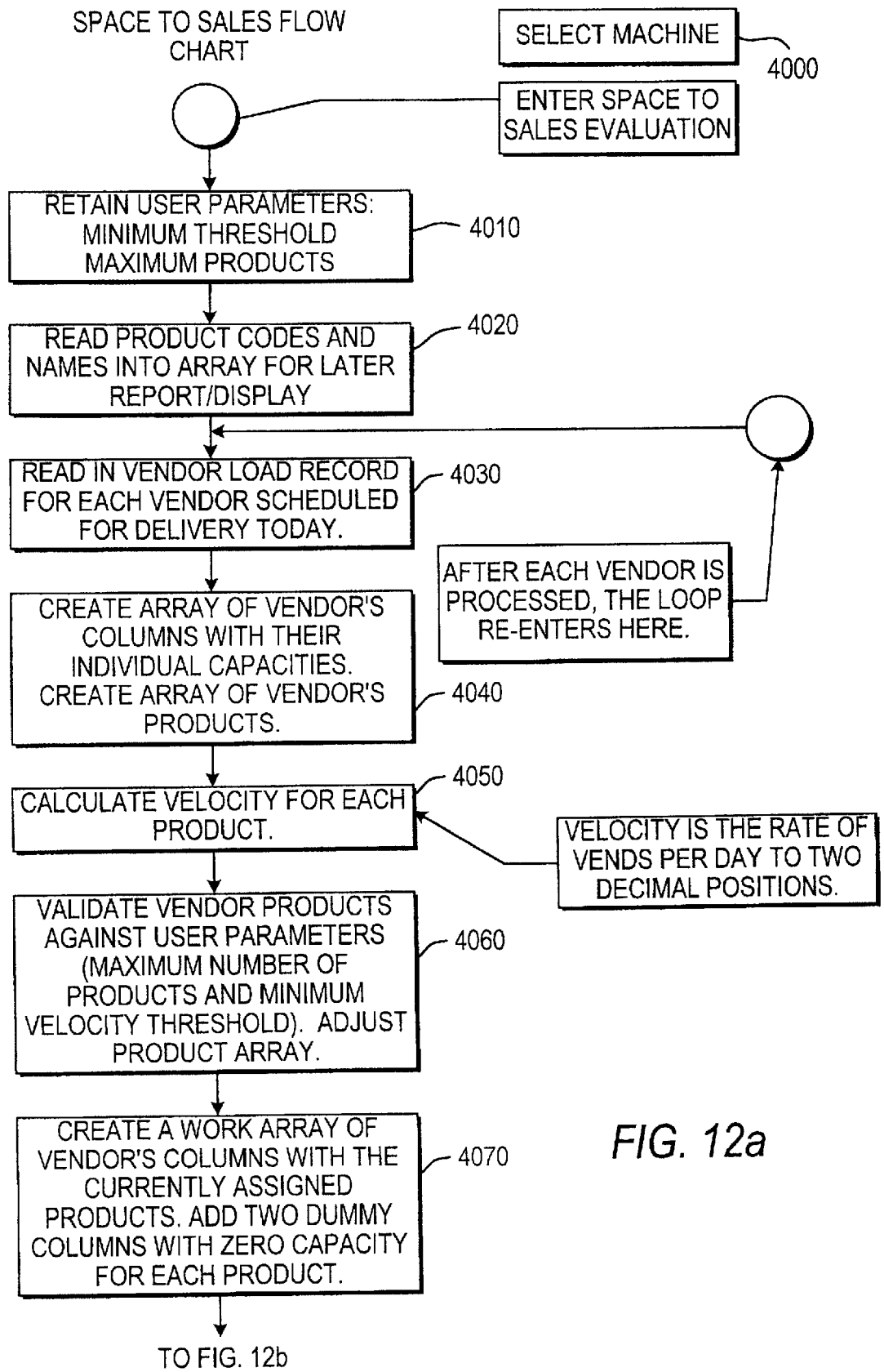
FIG. 12 is a flow chart of a preferred embodiment of a process for receiving information from a monitored vending machine and providing efficient service to the machine in response to the information so received.

Referring to FIG. 12(a), a vending machine is selected for scheduling (4000), said vending machine comprising at least one supply column for holding a supply of at least one product, and at least one selection button. User parameters with respect to the selected machine are obtained and stored (4010), preferably in computer-readable format, including a minimum threshhold and maximum product capacity, and the number of vending columns in said machine and the capacity of each of said columns; product codes and the associated product names may also be stored (4020) for use in report or display generation. For the particular time, a vender load record is obtained (4030) for each machine to be scheduled. An array of the vending columns and capacities and products is created (4040), preferably using microprocessor means accessing computer-readable data. The velocity of each product is calculated (4050), preferably using microprocessor means, as the rate of vends per day, preferably to two decimal places. Vender products are validated against the user parameters (4060) which set limits for a maximum number of products and minimum velocity, and the array is adjusted accordingly, if necessary. A work array is then created (4070) comprising vender's columns and the products currently assigned to those columns, and two dummy columns are added with zero capacity for each product.

Referring to FIG. 12(b), a capacity is then calculated for each product (4080) by allocating total vending machine capacity among products in proportion to the ratio of each product's velocity to the total vending machine velocity.

The capacity is adjusted by an iterative process, the goal of which is to minimize the value of the sum of the squares of the difference between product column capacity and optimum column capacity ("FIT"). FIT is first calculated for the then-current configuration of products to columns (4090). Two columns containing different products are then selected and exchanged and a new value of FIT calculated (4100). The new value of FIT is compared with the old value of FIT (4110). If the value has decreased, the new configuration is used as the new "then-current" configuration (4120); if the value has not decreased, the original configuration is retained as the "then-current" configuration (4130). The process is repeated until the smallest value of FIT is found (4140).

Figure 12C:
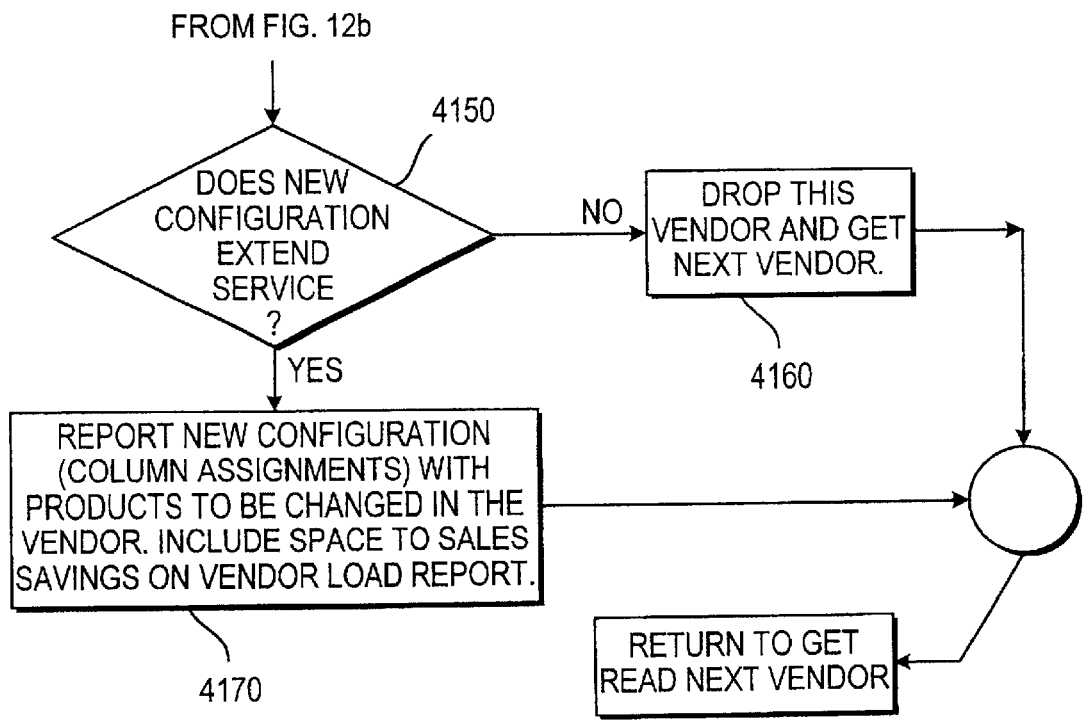

Referring to FIG. 12(c), a determination is next made whether the then-current configuration associated with the minimum value of FIT extends the service period (4150); if not, the initial configuration is retained and a new vending machine is selected for evaluation (4160). Otherwise, a recommendation is made to reconfigure the vending machine (4170), which reconfiguration may be accomplished by service personnel during the next visit, and a new vending machine is again selected for evaluation until all vending machines have been evaluated. Optionally, the effects of the changes on operations, such as savings in cost, may be captured and reported.

The preferred embodiment of the process is a microprocessor with hard disk for storing user parameters. A computer program suitable for carrying out the above process is attached as Appendix A, and reference is made thereto for additional details of operation.

In three experiments conducted using the above prototype on actual sales locations, improvements of 56.3%, 84.2% and 118.7% were recorded.

While specific embodiments of the invention has been shown and described in detail to illustrate the application of the principles of the invention, it will be understood that the invention may be embodied otherwise without departing from such principles and that various modifications, alternate constructions, and equivalents will occur to those skilled in the art given the benefit of this disclosure. Thus, the invention is not limited to the specific embodiment described herein, but is defined by the appended claims.

Appendix—Computer Source Code

The following Appendix, consisting of 1306 lines of source code, is copyrighted material.

We claim:

1. A vending machine system, comprising:
    a vending machine, comprising:
        a compartment comprising a plurality of supply columns that stores a plurality of different types of goods to be dispensed;
        a dispenser that dispenses selected goods from said different types of goods;
        a CPU that counts said selected goods dispensed by said dispenser to generate a total number of said selected goods dispensed for each of said plurality of supply columns;
        a machine identifier that identifies said vending machine; and
        a transmitter that communicates a signal comprising said machine identifier and said total number of said selected goods dispensed for each of said plurality of supply columns to a remote processing center; and
    said remote processing center receives said signal and calculates the capacity and velocity of each of said different types of goods based on said total number of said selected goods dispensed to determine an optimal configuration of said different types of goods in said plurality of supply columns that would maximize time efficiency between service periods for restocking of said different types of goods.

2. A vending machine system, comprising:
    a vending machine, comprising:
        a compartment comprising a plurality of supply columns that stores a plurality of different types of goods to be dispensed;
        a dispenser that dispenses selected goods from said different types of goods;

a CPU that counts said selected goods dispensed by said dispenser to generate a total number of said selected goods dispensed for each of said plurality of supply columns;

a machine identifier that identifies said vending machine; and a transmitter that communicates a signal comprising said machine identifier and said total number of said selected goods dispensed for each of said plurality of supply columns to a remote processing center; and said remote processing center receives said signal and calculates the capacity and velocity of each of said different types of goods based on said total number of said selected goods dispensed to determine an optimal configuration of said different types of goods in said plurality of supply columns that would maximize time efficiency between service periods for restocking of said different types of goods.

3. The system of claim 2, wherein said transmitter comprises an antenna for communicating said signal as a radio signal.

4. The system of claim 2, wherein said transmitter is a modem.

5. The system of claim 4, wherein said modem is a radio modem.

6. The system of claim 2, wherein said CPU is electrically coupled to a plurality of monitoring points in said vending machine to provide information regarding the status of said vending machine and report said status into a plurality of messages that is communicated by said transmitter to said remote processing center.

7. The system of claim 2, wherein said vending machine further comprises a power supply that is electrically coupled to said CPU and to said transmitter to provide power to said CPU and said transmitter.

8. The system of claim 6, wherein said plurality of monitoring points is comprised from the group consisting of AC voltage signals, signals from switches, and signals from motors.

9. The system of claim 6, wherein said CPU packages said information regarding the status of said vending machine from said plurality of monitoring points into a uniform data standard.

10. The system of claim 9, wherein said uniform data standard comprises the Direct Exchange Uniform Communication Standard (DEX/UCS).

11. The system of claim 2, wherein said communication between said transmitter and said remote processing center is a one-way communication.

12. The system of claim 2, wherein said remote processing center calculates said velocity by calculating a total velocity of said vending machine by dividing said total number of said selected goods for each of said plurality of supply columns vended by time.

13. The system of claim 12, wherein said time is comprised from the group consisting of a day, a week, and a month.

14. The system of claim 12, wherein said calculation of velocity further comprises calculating a product velocity by calculating a product velocity of each of said selected goods by dividing said total number of said selected goods for each of said plurality of supply columns vended by time.

15. The system of claim 14, wherein said time is comprised from the group consisting of a day, a week, and a month.

16. The system of claim 14, wherein said remote processing center further calculates the optimal capacity for each of said plurality of supply columns by dividing each said product velocity for each of said plurality of supply columns by said total velocity and multiplying the result of such calculation times the total capacity of the vending machine.

17. The system of claim 16, wherein said remote processing center further calculates a first FIT comprising the sum of the squares of the difference between the optimal capacity of said different types of goods in each of said plurality of supply columns and an actual product capacity stored in a configuration for said vending machine in memory coupled to said remote processing unit.

18. The system of claim 17, wherein said remote processing center swaps two of said plurality of supply columns containing said different types of goods to form a new configuration of said plurality of supply columns and calculates a new FIT to determine if said new FIT is smaller than said first FIT.

19. The system of claim 18, wherein said remote processing unit stores said new configuration for said plurality of supply columns to implement during a next service period of said vending machine if said new FIT is smaller than said first FIT.

20. The system of claim 18, wherein said remote processing center calculates said new FIT in an iterative manner until the FIT for all of said plurality of supply columns has been calculated to determine an optimal configuration of said different types of goods in said plurality of supply columns to implement during a next service period of said vending machine.

21. A vending machine system, comprising:

a vending machine, comprising:

a compartment comprising a plurality of supply columns that stores a plurality of different types of goods to be dispensed;

a dispenser that dispenses selected goods from said different types of goods;

a CPU that counts said selected goods dispensed by said dispenser to generate a total number of said selected goods dispensed for each of said plurality of supply columns;

a machine identifier that identifies said vending machine; and a means for transmitting a signal comprising said machine identifier and said total number of selected goods dispensed for each of said plurality of supply columns to a remote processing center; and said remote processing center comprising a means for determining the optimal configuration of each of said different types of goods in paid plurality of supply columns to maximize time efficiency between service periods for restocking of said different types of goods.

22. A system determining the optimal configuration of different types of goods in a plurality of supply columns in a vending machine, comprising a remote processing center that receives a signal comprising a machine identifier and a total number of selected goods dispensed from the different types goods dispensed by the vending machine and calculates the capacity and velocity of the vending machine to determine the optimal configuration to maximize time efficiency between service periods for restocking of the different types of goods.

23. The system of claim 22, wherein said remote processing center calculates said velocity by calculating a total velocity of the vending machine by dividing said total number of said selected goods for each of said plurality of supply columns vended by time.

24. The system of claim 23, wherein said time is comprised from the group consisting of a day, a week, and a month.

25. The system of claim 23, wherein said calculation of velocity further comprises calculating a product velocity by calculating a product velocity of each of said selected goods by dividing said total number of said selected goods for each of said plurality of supply columns vended by time.

26. The system of claim 25, wherein said time is comprised from the group consisting of a day, a week, and a month.

27. The system of claim 25, wherein said remote processing center further calculates the optimum capacity for each of said plurality of supply columns by dividing each of said product velocity for each of said plurality of supply columns by said total velocity and multiplying the result of such calculation times the total capacity of the vending machine.

28. The system of claim 27, wherein said remote processing center further calculates a first FIT comprising the sum of the squares of the difference between the optimal capacity of said different types of goods in each of said plurality of supply columns and an actual product capacity stored in a configuration for said vending machine in memory coupled to said remote processing unit.

29. The system of claim 28, wherein said remote processing center swaps two of said plurality of supply columns containing said different types of goods to form a new configuration of said plurality of supply columns and calculates a new FIT to determine if said new FIT is smaller than said first FIT.

30. The system of claim 29, wherein said remote processing unit stores said new configuration for said plurality of supply columns to implement during a next service period of said vending machine if said new FIT is smaller than said first FIT.

31. The system of claim 30, wherein said remote processing center calculates said new FIT in an iterative manner until the FIT for all of said plurality of supply columns has been calculated to determine the optimal configuration of said different types of goods in said plurality of supply columns to implement during a next service period of said vending machine.

32. A method for determining the optimal configuration of different types of goods in a plurality of supply columns in a vending machine, comprising the steps of:
   storing a configuration of the capacity of the plurality of supply columns and the different types of goods contained in each of the plurality of supply columns for the vending machine;
   receiving a signal from the vending machine comprising a machine identifier of the vending machine and the total number of said selected goods dispensed from the vending machine; and
   calculating a capacity and velocity of the vending machine to determine the optimal configuration of said different types of goods in the plurality of supply columns to maximize time efficiency between service periods for restocking of the different types of goods.

33. The method of claim 32, wherein said calculating said capacity and velocity comprises calculating a total velocity of said vending machine by dividing the total number of said selected goods for each of said plurality of supply columns vended by time.

34. The method of claim 33, wherein said calculating said capacity and velocity further comprises calculating a product velocity of said selected goods for each of the plurality of supply columns by dividing said total number of said selected goods for each of the plurality of supply columns vended by time.

35. The method of claim 34, wherein said calculating said capacity and velocity further comprises calculating the optimal capacity for each of the plurality of supply columns by dividing each said product velocity for each of said plurality of supply columns by said total velocity and multiplying the result of such calculation times the total capacity of the vending machine.

36. The method of claim 35, wherein said calculating said capacity and velocity further comprises calculating a first FIT comprising the sum of the squares of the difference between the optimal capacity of said different types of goods in each of said plurality of supply columns and an actual product capacity stored in a configuration for said vending machine in memory coupled to said remote processing unit.

37. The method of claim 36, wherein said calculating said capacity and velocity further comprises swapping two of the plurality of supply columns containing said different types of goods to form a new configuration of said plurality of supply columns and calculating a new FIT to determine if said new FIT is smaller than said first FIT.

38. The method of claim 37, wherein said calculating said capacity and velocity further comprises storing said new configuration for the plurality of supply columns to implement during a next service period of said vending machine if said new FIT is smaller than said first FIT.

39. The method of claim 37, wherein said calculating said capacity and velocity further comprises calculating said new FIT in an iterative manner until the FIT for all of the plurality of supply columns have been calculated to determine the optimal configuration of said different types of goods in said plurality of supply columns to implement during a next service period of said vending machine.

40. A method for determining the optimal configuration of different types of goods in a plurality of supply columns in a vending machine, comprising the steps of:
   storing a configuration of the capacity of the plurality of supply columns and the different types of goods contained in each of the plurality of supply columns for the vending machine;
   dispensing selected goods from the different types of goods from the vending machine;
   counting said individual ones of said selected goods dispensed by the vending machine and generating a total number of said selected goods dispensed in response to said dispensing;
   transmitting a signal from the vending machine comprising a machine identifier of the vending machine and said total number of said selected goods dispensed from the vending machine;
   receiving said signal from the vending machine; and
   calculating a capacity and velocity of the vending machine to determine the optimal configuration of the different types of goods in the plurality of supply columns should be changed on a next service period of the vending machine to maximize time efficiency between service periods for restocking of the different types of goods.

41. The method of claim 40, wherein said calculating a capacity and velocity comprises calculating a total velocity of the vending machine by dividing said total number of said selected goods for each of the plurality of supply columns vended by time.

42. The method of claim 41, wherein said time is comprised from the group consisting of a day, a week, and a month.

43. The method of claim 40, wherein said calculating a capacity and velocity comprises calculating a product velocity by calculating a product velocity of each of said selected goods by dividing said total number of said selected goods for each of the plurality of supply columns vended by time.

44. The method of claim 43, wherein said time is comprised from the group consisting of a day, a week, and a month.

45. The method of claim 43, wherein said calculating a capacity and velocity further comprises calculating a total velocity of each of the plurality of supply columns in said vending machine by dividing the number of selected goods dispensed in each column by time.

46. The method of claim 45, wherein said calculating a capacity and velocity further comprises calculating the optimal capacity for each of the plurality of supply columns by dividing each said product velocity for each of the plurality of supply columns by said total velocity of said vending machine and multiplying the result of such calculation times the total capacity of said vending machine.

47. The method of claim 46, wherein said calculating a capacity and velocity further comprises calculating a first FIT comprising the sum of the squares of the difference between the optimum capacity of each of the plurality of supply columns of said goods and an actual product capacity stored in a configuration for said vending machine in memory coupled to said remote processing unit.

48. The method of claim 47, wherein said calculating a capacity and velocity further comprises swapping two of the plurality of supply columns containing said different types of goods to form a new configuration of the plurality of supply columns and calculating a new FIT to determine if said new FIT is smaller than said first FIT.

49. The method of claim 48, further comprising storing said new configuration for the plurality of supply columns to reconfigure the plurality of supply columns during a next service period of said vending machine if said new FIT is smaller than said first FIT.

50. The method of claim 48, wherein said calculating a capacity and velocity further comprises calculating said new FIT in an iterative manner until the FIT for all of the plurality of supply columns have been calculated to determine the optimum configuration of the plurality of supply columns to reconfigure the plurality of supply columns during a next service period of said vending machine.

51. A vending machine system, comprising:
a vending machine, comprising:
a compartment comprising a plurality of supply columns that stores a plurality of different types of goods to be dispensed;
a dispenser that dispenses selected goods from said different types of goods;
a CPU that counts said selected goods dispensed by said dispenser to generate a total number of said selected goods dispensed for each of said plurality of supply columns;
a machine identifier that identifies said vending machine; and
a transmitter that communicates a signal comprising said machine identifier and said total number of said selected goods dispensed for each of said plurality of supply columns to a remote processing center; and
said remote processing center receives said signal and calculates the capacity and rate of sale of each of said different types of goods based on said total number of said selected goods dispensed to determine an optimal configuration of said different types of goods in said plurality of supply columns that would maximize time efficiency between service periods for restocking of said different types of goods.

52. The system of claim 51, wherein said transmitter comprises an antenna for communicating said signal as a radio signal.

53. The system of claim 51, wherein said transmitter is a modem.

54. The system of claim 53, wherein said modem is a radio modem.

55. The system of claim 51, wherein said CPU is electrically coupled to a plurality of monitoring points in said vending machine to provide information regarding the status of said vending machine and report said status into a plurality of messages that is communicated by said transmitter to said remote processing center.

56. The system of claim 51, wherein said vending machine further comprises a power supply that is electrically coupled to said CPU and to said transmitter to provide power to said CPU and said transmitter.

57. The system of claim 55, wherein said plurality of monitoring points is comprised from the group consisting of AC voltage signals, signals from switches, and signals from motors.

58. The system of claim 55, wherein said CPU packages said information regarding the status of said vending machine from said plurality of monitoring points into a uniform data standard.

59. The system of claim 58, wherein said uniform data standard comprises the Direct Exchange Uniform Communication Standard (DEX/UCS).

60. The system of claim 51, wherein said communication between said transmitter and said remote processing center is a one-way communication.

61. The system of claim 51, wherein said remote processing center calculates said rate of sale by calculating a total rate of sale of said vending machine by dividing said total number of said selected goods for each of said plurality of supply columns vended by time.

62. The system of claim 61, wherein said time is comprised from the group consisting of a day, a week, and a month.

63. The system of claim 61, wherein said calculation of rate of sale further comprises calculating a product rate of sale by calculating a product rate of sale of each of said selected goods by dividing said total number of said selected goods for each of said plurality of supply columns vended by time.

64. The system of claim 63, wherein said time is comprised from the group consisting of a day, a week, and a month.

65. The system of claim 63, wherein said remote processing center further calculates the optimal capacity for each of said plurality of supply columns by dividing each said product rate of sale for each of said plurality of supply columns by said total rate of sale and multiplying the result of such calculation times the total capacity of said vending machine.

66. The system of claim 65, wherein said remote processing center further calculates a first FIT comprising the sum of the squares of the difference between the optimal capacity of said different types of goods in each of said plurality of supply columns and an actual product capacity stored in a configuration for said vending machine in memory coupled to said remote processing unit.

67. The system of claim 66, wherein said remote processing center swaps two of said plurality of supply columns containing said different types of goods to form a new configuration of said plurality of supply columns and calculates a new FIT to determine if said new FIT is smaller than said first FIT.

68. The system of claim 67, wherein said remote processing unit stores said new configuration for said plurality of supply columns to implement during a next service period of said vending machine if said new FIT is smaller than said first FIT.

69. The system of claim 67, wherein said remote processing center calculates said new FIT in an iterative manner until the FIT for all of said plurality of supply columns has been calculated to determine an optimal configuration of said different types of goods in said plurality of supply columns to implement during a next service period of said vending machine.

70. A vending machine system, comprising:
a vending machine, comprising:
a compartment comprising a plurality of supply columns that stores a plurality of different types of goods to be dispensed;
a dispenser that dispenses selected goods from said different types of goods;
a CPU that counts said selected goods dispensed by said dispenser to generate a total number of said selected goods dispensed for each of said plurality of supply columns;
a machine identifier that identifies said vending machine; and
a means for transmitting a signal comprising said machine identifier and said total number of selected goods dispensed for each of said plurality of supply columns to a remote processing center; and
said remote processing center comprising a means for determining the optimal configuration of each of said different types of goods in said plurality of supply columns to maximize time efficiency between service periods for restocking of said different types of goods.

71. A system determining the optimal configuration of different types of goods in a plurality of supply columns in a vending machine, comprising a remote processing center that receives a signal comprising a machine identifier and a total number of selected goods dispensed from the different types goods dispensed by the vending machine and calculates the capacity and rate of sale of the vending machine to determine the optimal configuration to maximize time efficiency between service periods for restocking of the different types of goods.

72. The system of claim 71, wherein said remote processing center calculates said rate of sale by calculating a total rate of sale of the vending machine by dividing said total number of said selected goods for each of said plurality of supply columns vended by time.

73. The system of claim 72, wherein said time is comprised from the group consisting of a day, a week, and a month.

74. The system of claim 72, wherein said calculation of rate of sale further comprises calculating a product rate of sale by calculating a product rate of sale of each of said selected goods by dividing said total number of said selected goods for each of said plurality of supply columns vended by time.

75. The system of claim 74, wherein said time is comprised from the group consisting of a day, a week, and a month.

76. The system of claim 74, wherein said remote processing center further calculates the optimum capacity for each of said plurality of supply columns by dividing each said product rate of sale for each of said plurality of supply columns by said total rate of sale and multiplying the result of such calculation times the total capacity of the vending machine.

77. The system of claim 76, wherein said remote processing center further calculates a first FIT comprising the sum of the squares of the difference between the optimal capacity of said different types of goods in each of said plurality of supply columns and an actual product capacity stored in a configuration for said vending machine in memory coupled to said remote processing unit.

78. The system of claim 77, wherein said remote processing center swaps two of said plurality of supply columns containing said different types of goods to form a new configuration of said plurality of supply columns and calculates a new FIT to determine if said new FIT is smaller than said first FIT.

79. The system of claim 78, wherein said remote processing unit stores said new configuration for said plurality of supply columns to implement during a next service period of said vending machine if said new FIT is smaller than said first FIT.

80. The system of claim 79, wherein said remote processing center calculates said new FIT in an iterative manner until the FIT for all of said plurality of supply columns has been calculated to determine the optimal configuration of said different types of goods in said plurality of supply columns to implement during a next service period of said vending machine.

81. A method for determining the optimal configuration of different types of goods in a plurality of supply columns in a vending machine, comprising the steps of:
storing a configuration of the capacity of the plurality of supply columns and the different types of goods contained in each of the plurality of supply columns for the vending machine;
receiving a signal from the vending machine comprising a machine identifier of the vending machine and the total number of said selected goods dispensed from the vending machine; and
calculating a capacity and rate of sale of the vending machine to determine the optimal configuration of said different types of goods in the plurality of supply columns to maximize time efficiency between service periods for restocking of the different types of goods.

82. The method of claim 81, wherein said calculating said capacity and rate of sale comprises calculating a total rate of sale of said vending machine by dividing the total number of said selected goods for each of said plurality of supply columns vended by time.

83. The method of claim 82, wherein said calculating said capacity and rate of sale further comprises calculating a product rate of sale of said selected goods for each of the plurality of supply columns by dividing said total number of said selected goods for each of the plurality of supply columns vended by time.

84. The method of claim 83, wherein said calculating said capacity and rate of sale further comprises calculating the optimal capacity for each of the plurality of supply columns by dividing each said product rate of sale for each of said plurality of supply columns by said total rate of sale and multiplying the result of such calculation times the total capacity of the vending machine.

85. The method of claim 84, wherein said calculating said capacity and rate of sale further comprises calculating a first FIT comprising the sum of the squares of the difference between the optimal capacity of said different types of goods in each of said plurality of supply columns and an actual product capacity stored in a configuration for said vending machine in memory coupled to said remote processing unit.

86. The method of claim 85, wherein said calculating said capacity and rate of sale further comprises swapping two of the plurality of supply columns containing said different types of goods to form a new configuration of said plurality of supply columns and calculating a new FIT to determine if said new FIT is smaller than said first FIT.

87. The method of claim 86, wherein said calculating said capacity and rate of sale further comprises storing said new configuration for the plurality of supply columns to implement during a next service period of said vending machine if said new FIT is smaller than said first FIT.

88. The method of claim 86, wherein said calculating said capacity and rate of sale further comprises calculating said new FIT in an iterative manner until the FIT for all of the plurality of supply columns has been calculated to determine the optimal configuration of said different types of goods in said plurality of supply columns to implement during a next service period of said vending machine.

89. A method for determining the optimal configuration of different types of goods in a plurality of supply columns in a vending machine, comprising the steps of:

storing a configuration of the capacity of the plurality of supply columns and the different types of goods contained in each of the plurality of supply columns for the vending machine;

dispensing selected goods from the different types of goods from the vending machine;

counting said individual ones of said selected goods dispensed by the vending machine and generating a total number of said selected goods dispensed in response to said dispensing;

transmitting a signal from the vending machine comprising a machine identifier of the vending machine and said total number of said selected goods dispensed from the vending machine;

receiving said signal from the vending machine; and calculating a capacity and rate of sale of the vending machine to determine the optimal configuration of the different types of goods in the plurality of supply columns should be changed on a next service period of the vending machine to maximize time efficiency between service periods for restocking of the different types of goods.

90. The method of claim 89, wherein said calculating a capacity and rate of sale comprises calculating a total rate of sale of the vending machine by dividing said total number of said selected goods for each of the plurality of supply columns vended by time.

91. The method of claim 90, wherein said time is comprised from the group consisting of a day, a week, and a month.

92. The method of claim 89, wherein said calculating a capacity and rate of sale comprises calculating a product rate of sale by calculating a product rate of sale of each of said selected goods by dividing said total number of said selected goods for each of the plurality of supply columns vended by time.

93. The method of claim 92, wherein said time is comprised from the group consisting of a day, a week, and a month.

94. The method of claim 92, wherein said calculating a capacity and rate of sale further comprises calculating a total velocity of each of the plurality of supply columns in said vending machine by dividing the number of selected goods dispensed in each column by time.

95. The method of claim 94, wherein said calculating a capacity and rate of sale further comprises calculating the optimal capacity for each of the plurality of supply columns by dividing each said product rate of sale for each of the plurality of supply columns by said total rate of sale of said vending machine and multiplying the result of such calculation times the total capacity of the vending machine.

96. The method of claim 95, wherein said calculating a capacity and rate of sale further comprises calculating a first FIT comprising the sum of the squares of the difference between the optimum capacity of each of the plurality of supply columns of said goods and an actual product capacity stored in a configuration for said vending machine in memory coupled to said remote processing unit.

97. The method of claim 96, wherein said calculating a capacity and rate of sale further comprises swapping two of the plurality of supply columns containing said different types of goods to form a new configuration of the plurality of supply columns and calculating a new FIT to determine if said new FIT is smaller than said first FIT.

98. The method of claim 97, further comprises storing said new configuration for the plurality of supply columns to reconfigure the plurality of supply columns during a next service period of said vending machine if said new FIT is smaller than said first FIT.

99. The method of claim 97, wherein said calculating a capacity and rate of sale further comprises calculating said new FIT in an iterative manner until the FIT for all of the plurality of supply columns has been calculated to determine the optimum configuration of the plurality of supply columns to reconfigure the plurality of supply columns during a next service period of said vending machine.

100. A vending machine system, comprising:
a vending machine, comprising:
a compartment comprising a plurality of supply columns that stores a plurality of different types of goods to be dispensed;
a dispenser that dispenses selected goods from said different types of goods;
a CPU that counts said selected goods dispensed by said dispenser to generate a total number of said selected goods dispensed for each of said plurality of supply columns;
a machine identifier that identifies said vending machine; and
a transmitter that communicates a signal comprising said machine identifier and said total number of said selected goods dispensed for each of said plurality of supply columns to a remote processing center; and
said remote processing center receives said signal and generates inventory levels for each of said different types of goods in the vending machine.

101. The system of claim 100, wherein said remote processing center further comprises a memory to store said inventory level.

102. The system of claim 101, wherein said remote processing center generates a current inventory status by subtracting said total number of selected goods dispensed from said inventory levels for each of said different types of goods previously stored in memory to formulate updated inventory levels for each of said different type of goods.

103. The system of claim 102, wherein said remote processing center calculates sales information for each of said different types of goods based on said inventory levels.

104. The system of claim 100, wherein said remote processing center calculates sales information for each of said different types of goods based on said inventory levels.

105. The system of claim 102, wherein said remote processing center calculates said sales information for each of said different types of goods by individually multiplying the current inventory status for each of said different types of goods by the price each of said different types of goods respectively.

106. A vending machine system, comprising:
a vending machine, comprising:
a compartment comprising a plurality of supply columns that stores a plurality of different types of goods to be dispensed;
a dispenser that dispenses selected goods from said different types of goods;
a CPU that counts said selected goods dispensed by said dispenser to generate a total number of said selected goods dispensed for each of said plurality of supply columns;
a machine identifier that identifies said vending machine; and
a means for transmitting a signal comprising said machine identifier and said total number of selected goods dispensed for each of said plurality of supply columns to a remote processing center; and
said remote processing center comprising a means for said remote processing center generating inventory levels for each of said different types of goods in the vending machine.

107. A system determining the optimal configuration of different types of goods in a plurality of supply columns in a vending machine, comprising a remote processing center that receives a signal comprising a machine identifier and a total number of selected goods dispensed from the different types goods dispensed by the vending and generates inventory levels for each of said different types of goods in the vending machine.

108. The system of claim 107, wherein said remote processing center further comprises a memory to store said inventory level.

109. The system of claim 108, wherein said remote processing center generates a current inventory status by subtracting said total number of selected goods dispensed from said inventory levels for each of the different types of goods previously stored in memory to formulate updated inventory levels for each of the different type of goods.

110. The system of claim 109, wherein said remote processing center calculates sales information for each of the different types of goods based on said inventory levels.

111. The system of claim 107, wherein said remote processing center calculates sales information for each of the different types of goods based on said inventory levels.

112. The system of claim 109, wherein said remote processing center calculates said sales information for each of the different types of goods by individually multiplying the current inventory status for each of the different types of goods by the price of each of the different types of goods respectively.

113. A method for determining the optimal configuration of different types of goods in a plurality of supply columns in a vending machine, comprising the steps of:
storing a configuration of the capacity of the plurality of supply columns and the different types of goods contained in each of the plurality of supply columns for the vending machine;
receiving a signal from the vending machine comprising a machine identifier of the vending machine and the total number of said selected goods dispensed from the vending machine; and
generating inventory levels for each of said different types of goods in the vending machine.

114. The method of claim 113, wherein said generating inventory levels comprises a memory to store said inventory level.

115. The method of claim 114, wherein said generating inventory levels further comprises generating a current inventory status by subtracting said total number of selected goods dispensed from said inventory levels for each of the different types of goods previously stored in said memory to formulate updated inventory levels for each of the different type of goods.

116. The method of claim 115, wherein said generating inventory levels further comprises calculating sales information for each of the different types of goods based on said inventory levels.

117. The method of claim 113, wherein said generating inventory levels further comprises calculating sales information for each of the different types of goods based on said inventory levels.

118. The method of claim 115, wherein said generating inventory levels further comprises calculating said sales information for each of the different types of goods by individually multiplying the current inventory status for each of the different types of goods by the price each of the different types of goods respectively.

119. A method for determining the optimal configuration of different types of goods in a plurality of supply columns in a vending machine, comprising the steps of:
storing a configuration of the capacity of the plurality of supply columns and the different types of goods contained in each of the plurality of supply columns for the vending machine;
dispensing selected goods from the different types of goods from the vending machine;
counting individual ones of said selected goods dispensed by the vending machine and generating a total number of said selected goods dispensed in response to said dispensing;
transmitting a signal from the vending machine comprising a machine identifier of the vending machine and said total number of said selected goods dispensed from the vending machine;
receiving said signal from the vending machine; and
generating inventory levels for each of said different types of goods in the vending machine.

120. The method of claim 119, wherein said generating inventory levels comprises a memory to store said inventory level.

121. The method of claim 120, wherein said generating inventory levels further comprises generating a current inventory status by subtracting said total number of selected goods dispensed from said inventory levels for each of the different types of goods previously stored in memory to formulate updated inventory levels for each of the different type of goods.

122. The method of claim 121, wherein said generating inventory levels further comprises calculating sales information for each of the different types of goods based on said inventory levels.

123. The method of claim 122, wherein said generating inventory levels further comprises calculating sales information for each of the different types of goods based on said inventory levels.

124. The method of claim 121, wherein said generating inventory levels further comprises calculating said sales information for each of the different types of goods by individually multiplying the current inventory status for each of the different types of goods by the price each of the different types of goods respectively.

125. An apparatus for receiving a signal comprising a machine identifier and a total number of said selected goods dispensed for each of said plurality of supply columns in a vending machine, comprising:

a remote processing center that receives the signal;

said remote processing center coupled to a memory that contains at least one user parameter for the vending machine wherein said remote processing center is adapted to access said at least one user parameter for the vending machine.

126. The apparatus of claim 125, wherein said remote processing center accesses said at least one user parameter for the vending machine based on the machine identifier of the vending machine.

127. The apparatus of claim 125, wherein said at least one user parameter is comprised from the group consisting of a minimum threshold capacity of the vending machine, a maximum product capacity of the vending machine, a number of supply columns in the vending machine, a capacity of each of the supply columns in the vending machine; a product code of the goods stored in the vending machine, and an associated product name for the goods stored in the vending machine.

128. The apparatus of claim 125, wherein said remote processing center uses said at least one user parameter is input into a report generated by said remote processing center.

129. The apparatus of claim 128, wherein said remote processing center displays said report.

130. The apparatus of claim 125, wherein said remote processing center displays said at least one user parameter.

* * * * *